United States Patent

Uchiki et al.

[11] Patent Number: 5,844,907
[45] Date of Patent: Dec. 1, 1998

[54] SYNCHRONIZATION DETERMINING CIRCUIT, DEMODULATOR AND COMMUNICATION SYSTEM

[75] Inventors: Tatsuya Uchiki; Toshiharu Kojima, both of Tokyo, Japan

[73] Assignee: Mitsubishi Denki Kabushiki Kaisha, Tokyo, Japan

[21] Appl. No.: 685,746

[22] Filed: Jul. 24, 1996

[30] Foreign Application Priority Data

Nov. 28, 1995 [JP] Japan ................................. 7-308945

[51] Int. Cl.⁶ ....................................................... H04L 1/02
[52] U.S. Cl. .......................................... 370/517; 375/267
[58] Field of Search ..................................... 370/366, 536, 370/542, 508, 503, 516, 517, 502, 514, 510; 375/347, 267, 346, 362, 364, 365, 371; 455/139; 371/69.1

[56] References Cited

U.S. PATENT DOCUMENTS 3,409,875 11/1968 Jager et al. ............................. 375/267
5,305,353 4/1994 Weerackody ........................... 375/347
5,710,784 1/1998 Kindred et al. ........................ 375/262

FOREIGN PATENT DOCUMENTS 1233847 9/1989 Japan .
6276107 9/1994 Japan .

*Primary Examiner*—Chau Nguyen
*Assistant Examiner*—Kenneth Vanderpuye
*Attorney, Agent, or Firm*—Rothwell, Figg, Ernst & Kurz

[57] ABSTRACT

A synchronization determining method and circuit for determining a synchronization state of a multiplexed data stream derived by multiplexing a plurality of data streams having the same contents with a time lag provided therebetween, wherein the synchronization determining circuit establishes synchronization without decreasing transmission efficiency, generating incorrect code sequences, or increasing overall circuit scale. In each embodiment of the present invention, synchronization is established without using synchronization words. Because synchronization is achieved without feedback loop delay, incorrectly decoded sequences are not generated for a period of time before synchronization is established. Also, because no maximum pass metric state detecting circuit is required, circuit scale, power consumption, and operating speed can be improved.

16 Claims, 37 Drawing Sheets

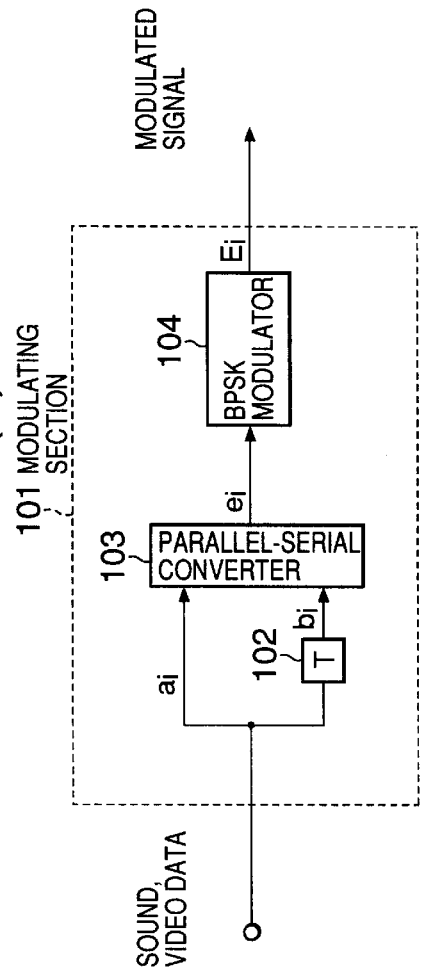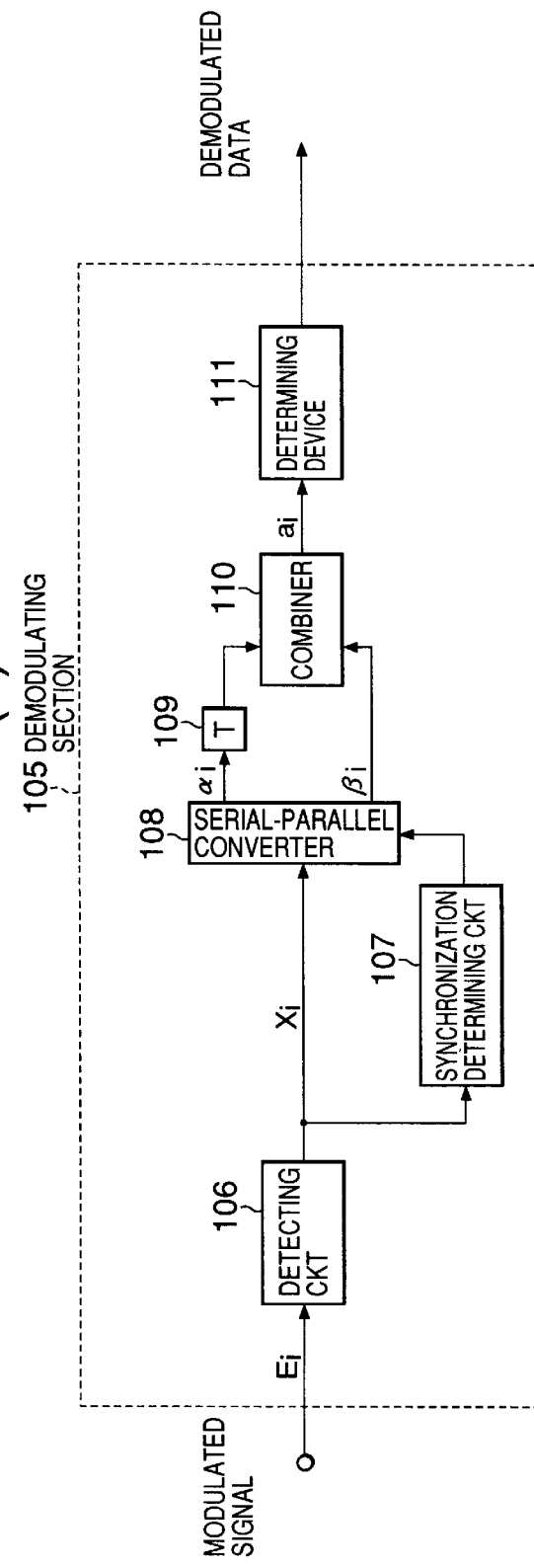

| $a_{-2}$ | $a_{-1}$ | $a_0$ | $a_1$ | $a_2$ | ... | $a_{N-1}$ | $a_N$ | $a_{N+1}$ | ... |

(b_i)

| $b_{-2}$ $= a_{-2-N}$ | $b_{-1}$ $= a_{-1-N}$ | $b_0$ $= a_{-N}$ | $b_1$ $= a_{1-N}$ | $b_2$ $= a_{2-N}$ | ... | $b_{N-1}$ $= a_{-1}$ | $b_N$ $= a_0$ | $b_{N+1}$ $= a_1$ | ... |

(e_i)

| $e_{-4}$ $= a_{-2}$ | $e_{-3}$ $= b_{-2}$ | $e_{-2}$ $= a_{-1}$ | $e_{-1}$ $= b_{-1}$ | $e_0$ $= a_0$ | $e_1$ $= b_0$ | $e_2$ $= a_1$ | $e_3$ $= b_1$ | $e_4$ $= a_2$ | $e_5$ $= b_2$ | ... | $e_{2N-2}$ $= a_{N-1}$ | $e_{2N-1}$ $= b_{N-1}$ | $e_{2N}$ $= a_N$ | $e_{2N+1}$ $= b_N$ | $e_{2N+2}$ $= a_{N+1}$ | $e_{2N+3}$ $= b_{N+1}$ | ... |

| (Xi) | ... | $X_{-4}$ = $a_{-2}$ | $X_{-3}$ = $a_{-2-N}$ | $X_{-2}$ = $a_{-1}$ | $X_{-1}$ = $a_{-1-N}$ | $X_0$ = $a_0$ | $X_1$ = $a_{-N}$ | $X_2$ = $a_1$ | $X_3$ = $a_{1-N}$ | $X_4$ = $a_2$ | $X_5$ = $a_{2-N}$ | ... | $X_{2N-2}$ = $a_{N-1}$ | $X_{2N-1}$ = $a_{-1}$ | $X_{2N}$ = $a_N$ | $X_{2N+1}$ = $a_0$ | $X_{2N+2}$ = $a_{N+1}$ | $X_{2N+3}$ = $a_1$ | ... |

$X_{2i} = a_i$
$X_{2i+1} = a_{i-N}$

STATE ①

| (Pi) | ... | $a_{-2}$ | $a_{-1}$ | $a_0$ | $a_1$ | $a_2$ | ... | $a_{N-1}$ | $a_N$ | $a_{N+1}$ | ... |
| (Qi) | ... | $a_{-2-N}$ | $a_{-1-N}$ | $a_{-N}$ | $a_{1-N}$ | $a_{2-N}$ | ... | $a_{-1}$ | $a_0$ | $a_1$ | ... |

STATE ②

| (Pi) | ... | $a_{-2-N}$ | $a_{-1-N}$ | $a_{-N}$ | $a_{1-N}$ | $a_{2-N}$ | ... | $a_{-1}$ | $a_0$ | $a_1$ | ... |
| (Qi) | ... | $a_{-1}$ | $a_0$ | $a_1$ | $a_2$ | $a_3$ | ... | $a_N$ | $a_{N+1}$ | $a_{N+2}$ | ... |

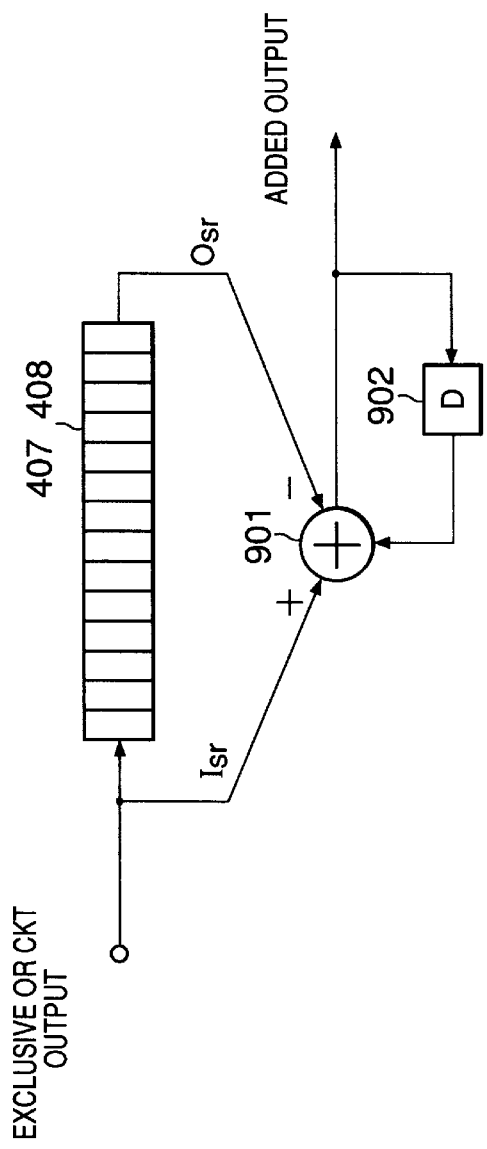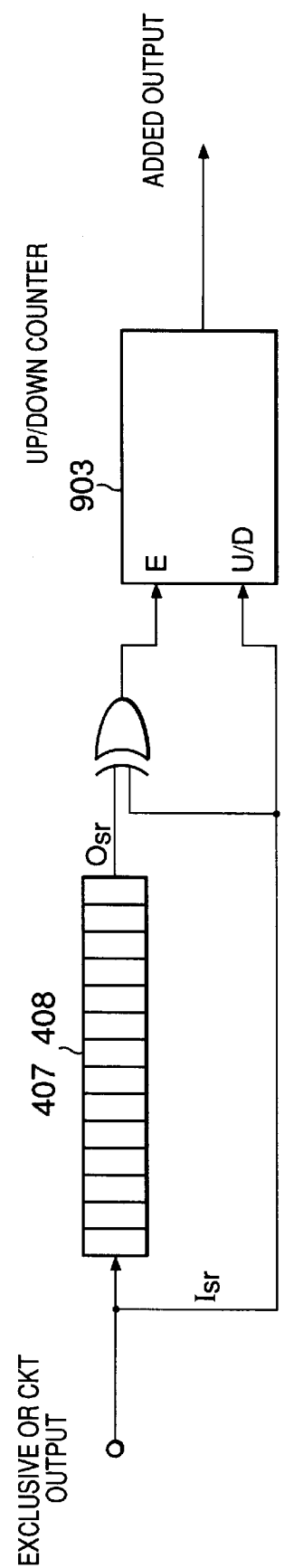
FIG.9(a)
FIG.9(b)

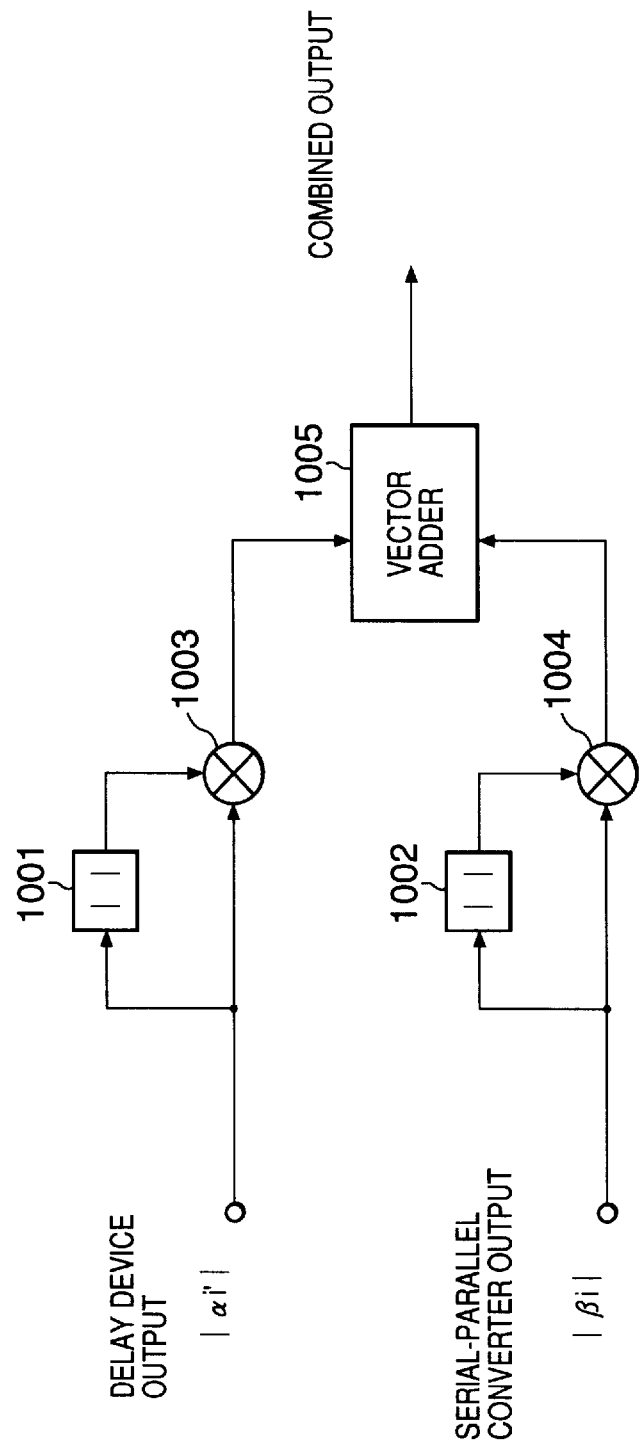

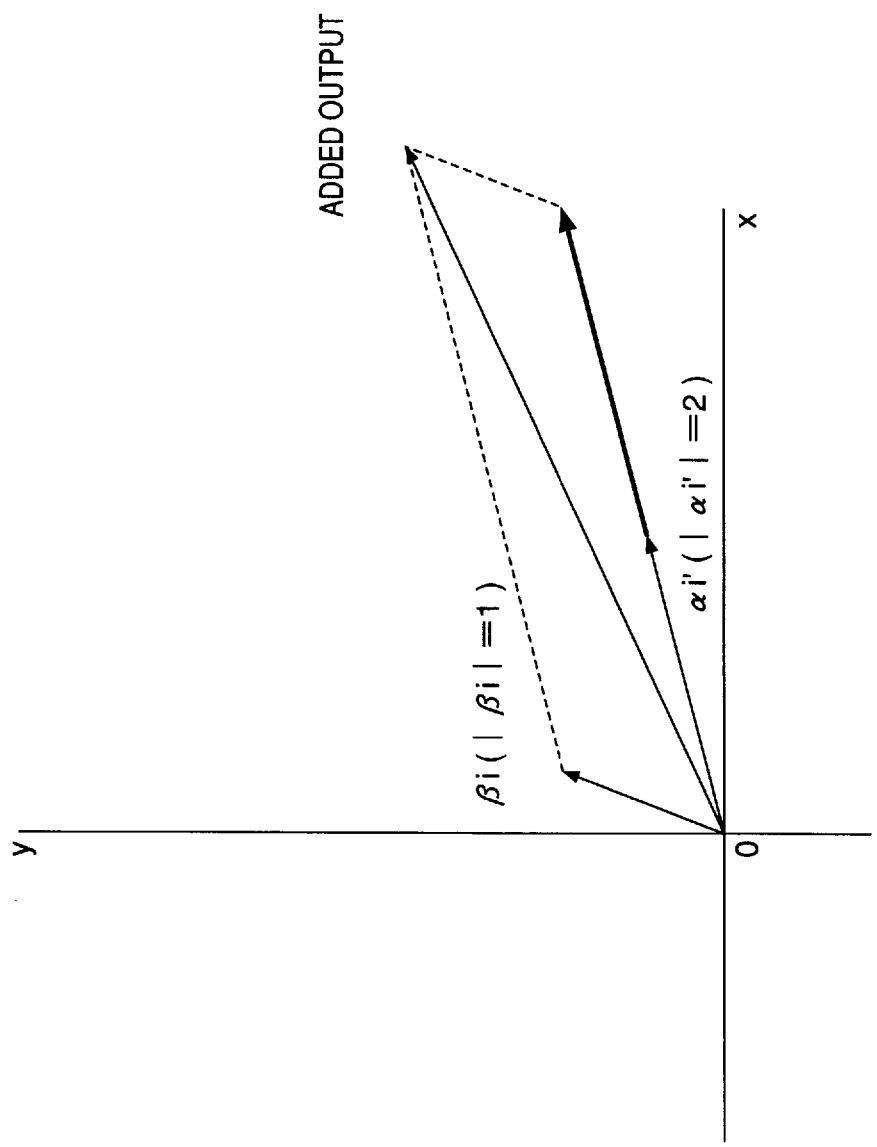

| |Xi| | X-4 = A-1 | X-3 = B-1 | X-2 = A-1' | X-1 = B-1' | X0 = A0 | X1 = B0 | X2 = A0' | X3 = B0' | X4 = A1 | X5 = B1 | X6 = A1' | X7 = B1' |

STATE ①

| |αi| | A-1 | A0 | A1 |
| |βi| | B-1 | B0 | B1 |
| |γi| | A-1' | A0' | A1' |
| |δi| | B-1' | B0' | B1' |

STATE ②

| |αi| | B-1 | B0 | B1 |
| |βi| | A-1' | A0' | A1' |
| |γi| | B-1' | B0' | B1' |
| |δi| | A0 | A1 | A2 |

STATE ③

| |αi| | A-2' | A-1' | A0' | A1' |
| |βi| | B-2' | B-1' | B0' | B1' |
| |γi| | A-1 | A0 | A1 | A2 |
| |δi| | B-1 | B0 | B1 | B2 |

STATE ④

| |αi| | B-2' | B-1' | B0' |
| |βi| | A-1 | A0 | A1 |
| |γi| | B-1 | B0 | B1 |
| |δi| | A-1' | A0' | A1' |

FIG.20

| |Xi| | X-4 = a₋₁ | X-3 = b₋₁ | X-2 = a₋₁' | X-1 = b₋₁' | X0 = a0 | X1 = b0 | X2 = a0' | X3 = b0' | X4 = a1 | X5 = b1 | X6 = a1' | X7 = b1' |

$X_{4i} = a_i$
$X_{4i+1} = b_i$
$X_{4i+2} = a_i'$
$X_{4i+3} = b_i'$

STATE ①

| |Pi| | a₋₁ | a0 | a1 |
| |Qi| | b₋₁ | b0 | b1 |
| |Ri| | a₋₁' | a0' | a1' |
| |Si| | b₋₁' | b0' | b1' |

STATE ②

| |Pi| | b₋₁ | b0 | b1 |
| |Qi| | a₋₁' | a0' | a1' |
| |Ri| | b₋₁' | b0' | b1' |
| |Si| | a0 | a1 | a2 |

STATE ③

| |Pi| | a₋₂' | a₋₁' | a0' | a1' |
| |Qi| | b₋₂' | b₋₁' | b0' | b1' |
| |Ri| | a₋₁ | a0 | a1 | a2 |
| |Si| | b₋₁ | b0 | b1 | b2 |

STATE ④

| |Pi| | b₋₂' | b₋₁' | b0' |
| |Qi| | a₋₁ | a0 | a1 |
| |Ri| | b₋₁ | b0 | b1 |
| |Si| | a₋₁' | a0' | a1' |

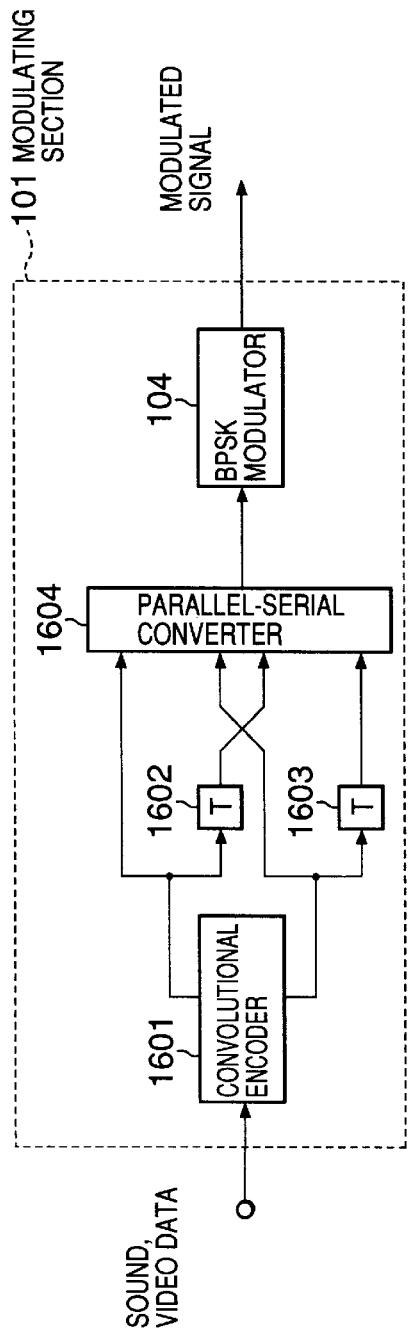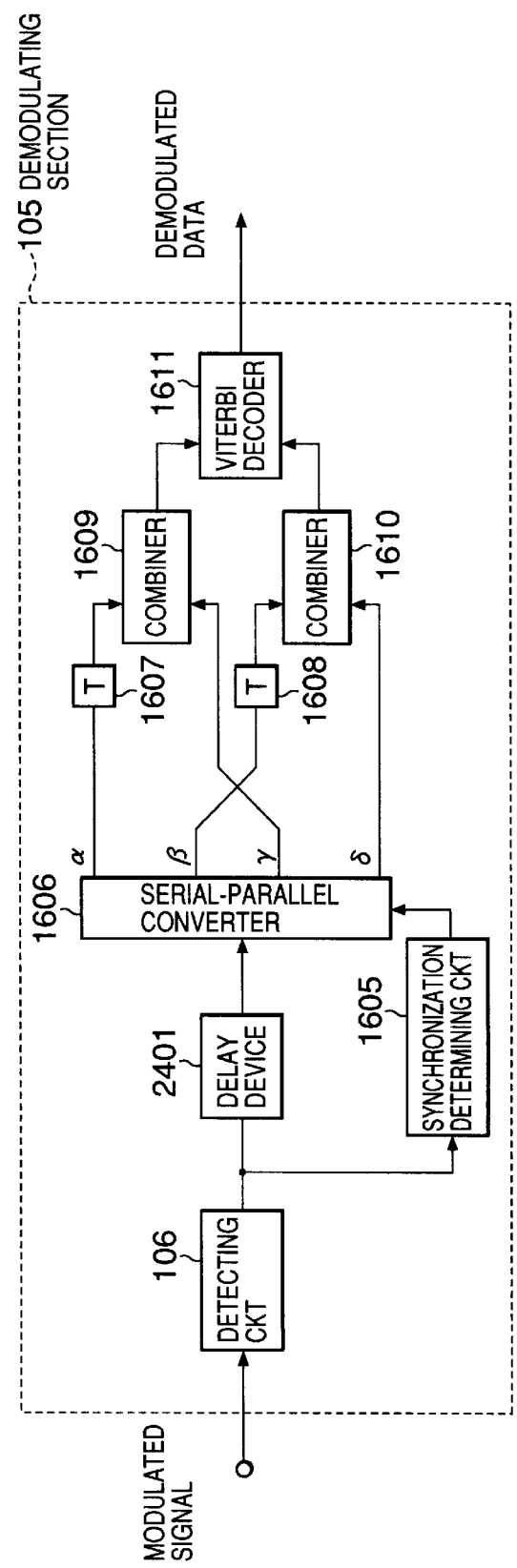
FIG.24(a)
FIG.24(b)

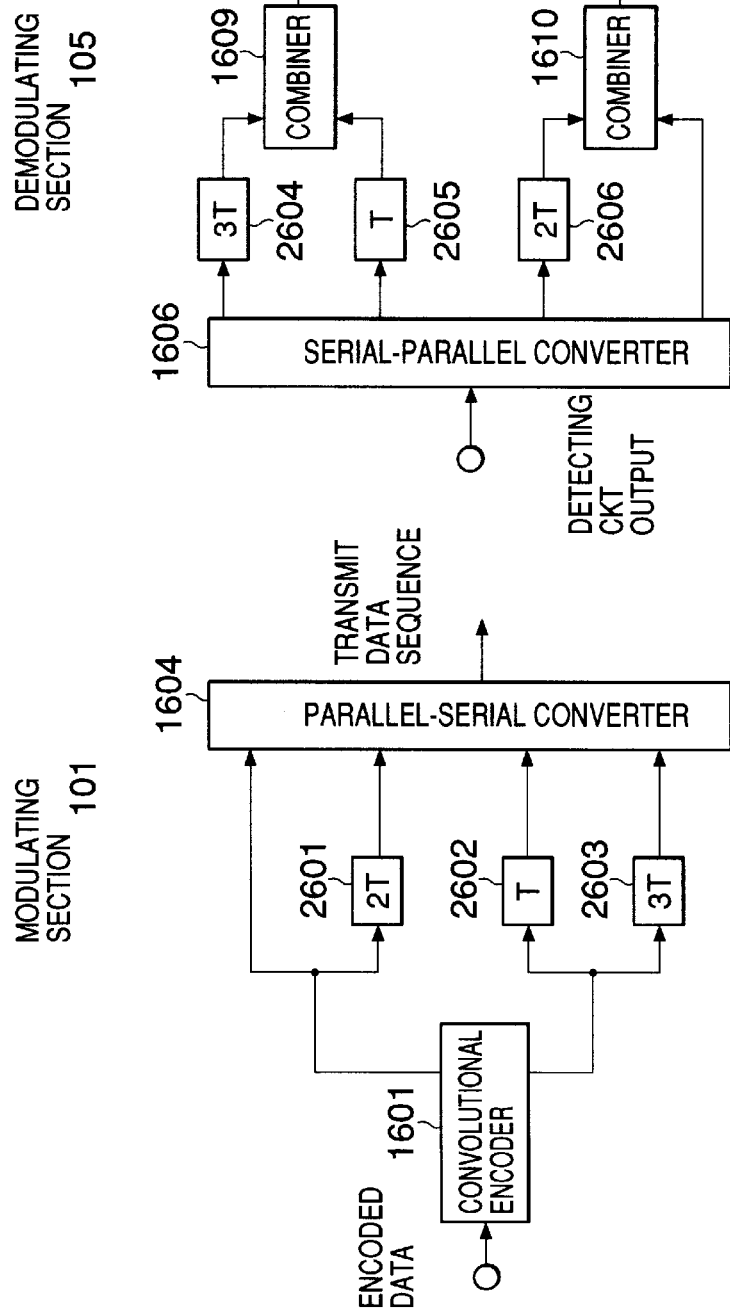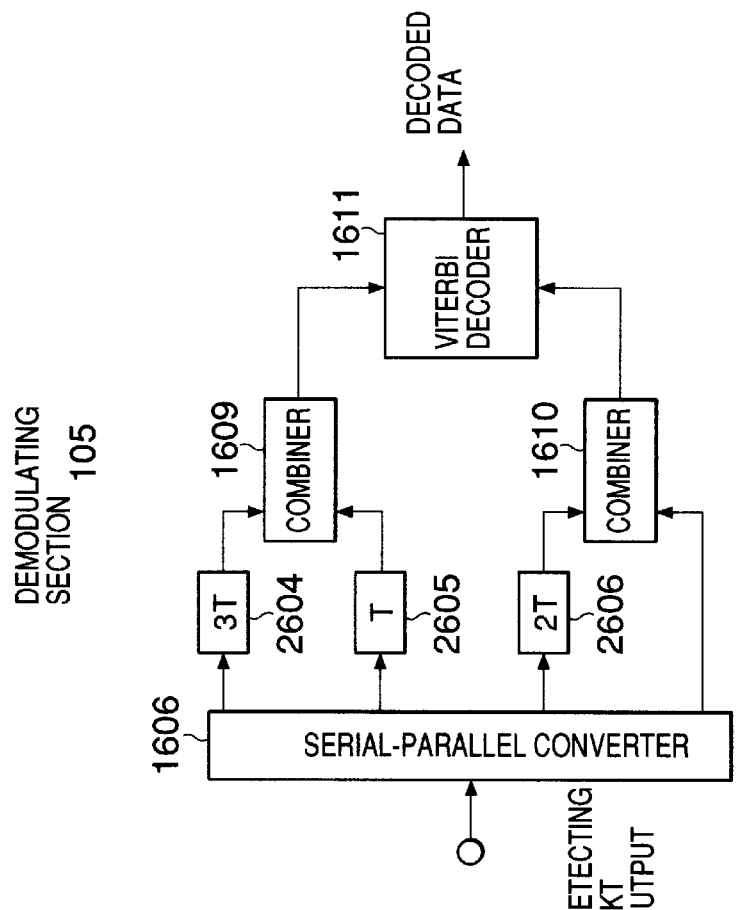
FIG.27(b)
FIG.27(a)

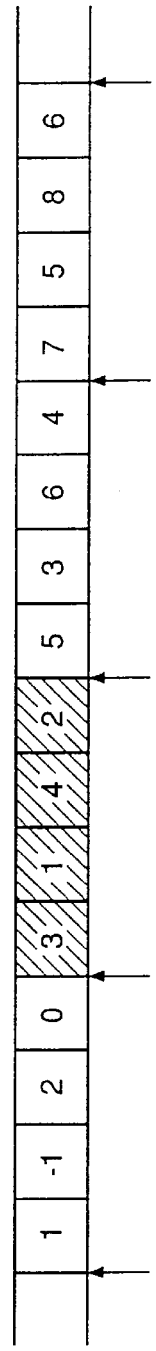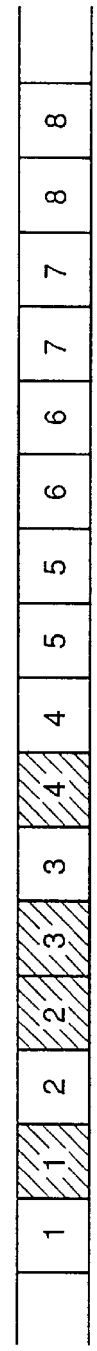
FIG.36(a) (PRIOR ART)
FIG.36(b) (PRIOR ART)

SYNCHRONIZATION DETERMINING CIRCUIT, DEMODULATOR AND COMMUNICATION SYSTEM

BACKGROUND OF THE INVENTION

1. Field of the Invention

The present invention relates to the field of radio communication, and more particularly, to improvements in signal synchronization and demodulation.

2. Description of the Related Art

In any radio communication system, it is possible that data bits or frames are lost during transmission due to signal fading, or due to signal blockages caused by physical objects situated between transmitting and receiving devices. A conventional method of compensating for such data loss is described in Japanese Patent Application Laid-Open No. 1-233847 entitled "Data Receiving Device". The disclosed method employs a "time diversity" transmission scheme in which each data bit or frame is transmitted more than once. As long as at least one "copy" of each data bit or frame is successfully transmitted and received, a true data stream can be reconstructed at the receiving end. The probability that a single signal drop-out or blockage will cause a loss of every copy of a given data word can be minimized by increasing the time delay between successive transmissions of those copies. Note, however, that proper data reconstruction requires that both the transmitter and receiver be in agreement with respect to the data formatting and transmission scheme. A prior art approach for maintaining this required transmitter-receiver synchronization will be described with reference to FIGS. 33–36.

FIG. 33 depicts a transmitting device and a receiving device constructed in accordance with the above described conventional communication system. In FIG. 33, 3301 denotes a transmission processing circuit, 3302 denotes a frame forming circuit, 3303 denotes a reception processing circuit, and 3304 denotes a frame pattern detecting circuit.

FIGS. 34(a) and 34(b) illustrate the operation of the conventional communication processing circuit of FIG. 33, wherein FIG. 34(a) represents output of the communication processing circuit 3301 and FIG. 34(b) represents output of the frame forming circuit 3302. In FIG. 34(a), A represents input data and B represents output multiplexed data. Typically, sound or video data are first converted into a digital signal by means of a sound encoder or the like before being input to the transmission processing circuit 3301.

As shown in FIG. 34(a), the transmission processing circuit 3301 actually transmits each input data block A twice. Note that there is a fixed time lag between first transmission and retransmission of any given data block. To compensate for this doubling in the number of transmissions, the multiplexed data blocks B are transmitted at a data rate twice that of the input data A. The multiplexed data B are then input to the frame forming circuit 3302.

As shown in FIG. 34(b), the multiplexed data B are divided into frames by the frame forming circuit 3302, each frame containing N (here N=4) data blocks. Then, as also shown in FIG. 34(b), a synchronization word, or header, (SYNC) is added at the beginning of each data frame before the data are transmitted.

Data are typically transmitted by means of a transmission channel. Data received at the receiving device are input to the reception processing circuit 3303 and to the frame pattern detecting circuit 3304. The frame pattern detecting circuit 3304 performs detection of the data frame SYNC headers as described below.

FIG. 35 depicts the frame pattern detecting circuit 3304 in greater detail. In FIG. 35, 3501 denotes a correlating device. Data input to the frame pattern detecting device 3304 are input to the correlating device 3501. The correlating device correlates the incoming data stream with a SYNC signal derived from a copy of the SYNC header. When the computed correlation between the received data stream and the SYNC signal is greater than a preset threshold, the correlating device 3501 outputs a detection pulse to the reception processing circuit 3303, indicating that the input data frame SYNC headers have been detected. Based on the detection pulse input from the frame pattern detecting circuit 3304, the reception processing circuit 3303 identifies the location of the SYNC headers within the incoming data stream and rearranges the received data in its original order.

FIG. 36(a) depicts a situation in which an entire data frame within a transmitted data stream is lost during transmission (as indicated by hatched lines in the figure). However, because the transmitting device multiplexes each data block twice, the transmitted data can be reconstructed at the receiving device despite the transmission loss. Reconstruction is performed by rearranging the received data as shown in FIG. 36(b). Thus, so long as both copies of a given data block are not lost, the original data stream will be successfully received and reconstructed. Typically, the digital signal output from the reception processing circuit 3303 is decoded by a sound decoder or the like, and then output as sound or video data.

Note that in this conventional communication system, the synchronization word used to identify the start of each data frame is essential. If the incoming data stream is not properly synchronized, the reception processing circuit 3303 will rearrange the data incorrectly. Therefore, sharp correlation between the incoming data stream and the SYNC signal is required. This, in turn, requires that the synchronization word be relatively long as compared to the overall length of a data frame. Because such lengthy SYNC words lead to decreased transmission efficiency, the above described conventional approach is often unsatisfactory.

An alternative approach to robust communication with signal synchronization is described in Japanese Patent Application Laid-Open No. 6-276107, entitled "Synchronization Detecting Method of Viterbi Decoder". The disclosed method is based upon the well-known Viterbi (convolutional) error correction coding scheme. Generally, error correction coding involves the generation of n-bit code blocks from k-bit information data blocks. The ratio k/n, where k <n, is known as the coding rate. A decoder receiving a stream of coded data must be able to determine the precise breakpoints between coded blocks. Otherwise, a correctly decoded sequence will not be obtained. The prior art method of identifying these code word breakpoints will be described with reference to FIG. 37. Throughout the discussion, the terms "synchronous state" and "asynchronous state" will be used, respectively, to refer to the conditions in which the code word break-points identified by a receiver/decoder either coincide, or do not coincide, with those of a corresponding transmitter/encoder.

FIG. 37 depicts a receiving device constructed in accordance with the above described conventional communication system. In FIG. 37, 3701 denotes a phase shifter, 3702 denotes a Viterbi decoder, 3703 denotes a branch value output circuit, 3704 denotes a correlating device, and 3705 denotes a determining circuit.

Convolutionally encoded blocks (P i, Q i) are transmitted from a transmitting device, and received at a receiving device, by means of a transmission channel. The received data are detected at a detecting circuit (not shown) so that soft-determined data are input to the phase shifter 3701. The phase of the soft-determined data is then controlled, or time-shifted, by the phase shifter 3701 in dependence upon a phase control signal generated by the determining circuit 3705 (described below).

Output from the phase shifter 3701 is input to both the correlating device 3704 and to the Viterbi decoder 3702. Initially, input to the Viterbi decoder 3702 may be in either a synchronous state (i.e., P i, Q i) or an asynchronous state (i.e., Q i–1, P i). The Viterbi decoder 3702 decodes the received data and outputs a decoded data stream which will be correct (true data) only when input to the decoder is in the synchronous state. The Viterbi decoder 3702 also generates a maximum pass metric state value associated with the Viterbi decoding process and passes it to the branch value output circuit 3703.

The branch value output circuit 3703 uses the maximum pass metric to derive transitional branch values associated with the Viterbi decoding process. These branch values are passed to the correlating device 3704. If the input stream to the Viterbi decoder 3702 is in a synchronous state, the branch values will approximate that input stream. Otherwise, the branch values will be random.

The correlating device 3704 correlates the branch value output stream from the branch value output circuit 3703 with the input stream to the Viterbi decoder 3702 and outputs a resulting correlation value to the determining circuit 3705. The determining circuit 3705 compares this correlation value with a predetermined threshold and, based upon the comparison result, determines whether or not the input stream is synchronized. Based upon that decision, the determining device 3705 passes an appropriate phase control signal to the phase shifter 3701.

The phase shifter 3701 in turn controls the timing of the input stream based on the phase control signal received from the determining circuit 3705. Specifically, if the data stream is asynchronous (i.e., Q i–1, P i), the phase shifter 3701 shifts the data stream in time so that a synchronous state (P i, Q i) is achieved.

As described above, prior art Viterbi code synchronization determining circuits use the maximum pass metric derived during the Viterbi decoding process to derive a sequence approximating the Viterbi decoder input stream. Synchronization is based on the correlation value between the derived sequence and the input stream. Thus, the code synchronization determining circuit contains a feedback loop, and, due to the presence of loop delay, it is possible that an incorrectly decoded sequence will be output for a period of time before synchronization is established. Further, because a maximum pass metric detecting circuit must be included in the Viterbi decoder, the overall circuit scale, and the total power consumed, will be relatively large. Also, because computation of the maximum pass metric state is not essential to the Viterbi decoding operation, unnecessary reduction in operating speed is introduced.

In sum, the prior art schemes for signal synchronization within error-resistant communication systems are often unsatisfactory. In the first prior art scheme described above, data are transmitted in data frames containing synchronization headers, and received data are correlated with synchronization signals derived from the synchronization headers. Because sharp correlation is required in order to ensure correct data reconstruction, the synchronization headers must be relatively long. As a result, transmission efficiency is significantly reduced.

Additionally, the convolutional coding/Viterbi decoding scheme described above may generate incorrectly decoded sequences for a period of time before synchronization is established. This results from the fact that the implemented code synchronization determining circuit contains feedback and an associated loop delay. Further, because a maximum pass metric state detecting circuit is added within the Viterbi decoder, circuit scale and power consumption are increased, and operating speed is considerably reduced.

SUMMARY OF THE INVENTION

The present invention eliminates or at least mitigates the aforementioned problems. An object of the present invention is to provide a synchronization determining circuit for determining a synchronization state of a multiplex data stream derived by multiplexing a plurality of data streams having the same contents with a time lag provided therebetween, wherein said synchronization determining circuit establishes synchronization without decreasing transmission efficiency, generating incorrect code sequences, or increasing overall circuit scale.

In one embodiment of the present invention, a synchronization determining circuit is provided which determines a synchronization state of a multiplexed data stream derived by multiplexing a plurality of data streams having the same contents with a time lag provided therebetween. The synchronization determining circuit includes: separating means for separating the inputted multiplexed data stream to output a plurality of data streams; delaying means for delaying at least one of the plurality of data streams outputted from the separating means by a time corresponding to the time lag; comparing means for comparing the data stream delayed by the delaying means and another of the plurality of data streams outputted from the separating means which is not delayed by the delaying means so as to output comparison data; and synchronization determining means for determining the synchronization state of the multiplexed data stream based on the comparison data.

In another embodiment of the present invention, a synchronization determining method determines a synchronization state of a multiplexed data stream derived by multiplexing a plurality of data streams having the same contents with a time lag provided therebetween. The synchronization determining method includes: a separating step for separating the inputted multiplexed data stream to output a plurality of data streams; a delaying step for delaying at least one of the plurality of data streams outputted at the separating step by a time corresponding to the time lag; a comparing step for comparing the data stream delayed at the delaying step and a data stream which is not delayed at the delaying step so as to output comparison data; and a synchronization determining step for determining the synchronization state of the multiplexed data stream based on the comparison data.

In each embodiment of the present invention, synchronization is established without using synchronization words. Therefore, transmission efficiency is improved relative to the prior art. Further, because synchronization is achieved without feedback loop delay, incorrectly decoded sequences are not generated for a period of time before synchronization is established. Also, because no maximum pass metric state detecting circuit is required, improvements over the prior art can be achieved with respect to circuit scale, power consumption, and operating speed.

Other objects and advantages of the present invention will be made apparent in the detailed description presented below. It should be understood, however, that the detailed description and specific embodiments are given by way of example and illustration only. Various changes and modifications falling within the scope of the present invention will become apparent to those skilled in the art.

BRIEF DESCRIPTION OF THE DRAWINGS

FIGS. 1(a) and 1(b) are structural diagrams of a communication system constructed in accordance with a first embodiment of the present invention.

FIG. 2 is a diagram showing input/output data of a parallel-serial converter constructed in accordance with the first embodiment.

FIG. 3 is a diagram showing input/output data of a serial-parallel converter constructed in accordance with the first embodiment.

FIG. 5 is a diagram showing input/output data of a serial-parallel converter within the synchronization determining circuit of FIG. 4.

FIGS. 9(a) and 9(b) are structural diagrams of shift registers and adders within synchronization determining circuits constructed in accordance with third and fourth embodiments of the present invention.

FIG. 10 is a structural diagram of a combiner constructed in accordance with a fifth embodiment of the present invention.

FIG. 11 is a diagram showing operation of the combiner of FIG. 10.

FIG. 17 is a diagram showing input/output data of a parallel-serial converting circuit constructed in accordance with the eighth embodiment.

FIG. 18 is a diagram showing input/output data of a serial-parallel converting circuit constructed in accordance with the eighth embodiment.

FIG. 20 is a diagram showing input/output data of a serial-parallel converting circuit within the synchronization determining circuit of FIG. 19.

FIGS. 24(a) and 24(b) are structural diagrams of a communication system constructed in accordance with a ninth embodiment of the present invention.

FIGS. 27(a) and 27(b) are structural diagrams of a modulating section and a demodulating section constructed in accordance with a twelfth embodiment of the present invention.

FIGS. 36(a) and 36(b) are diagrams depicting received data in a conventional communication system.

DETAILED DESCRIPTION OF THE PREFERRED EMBODIMENTS

First Embodiment

Figure 4:
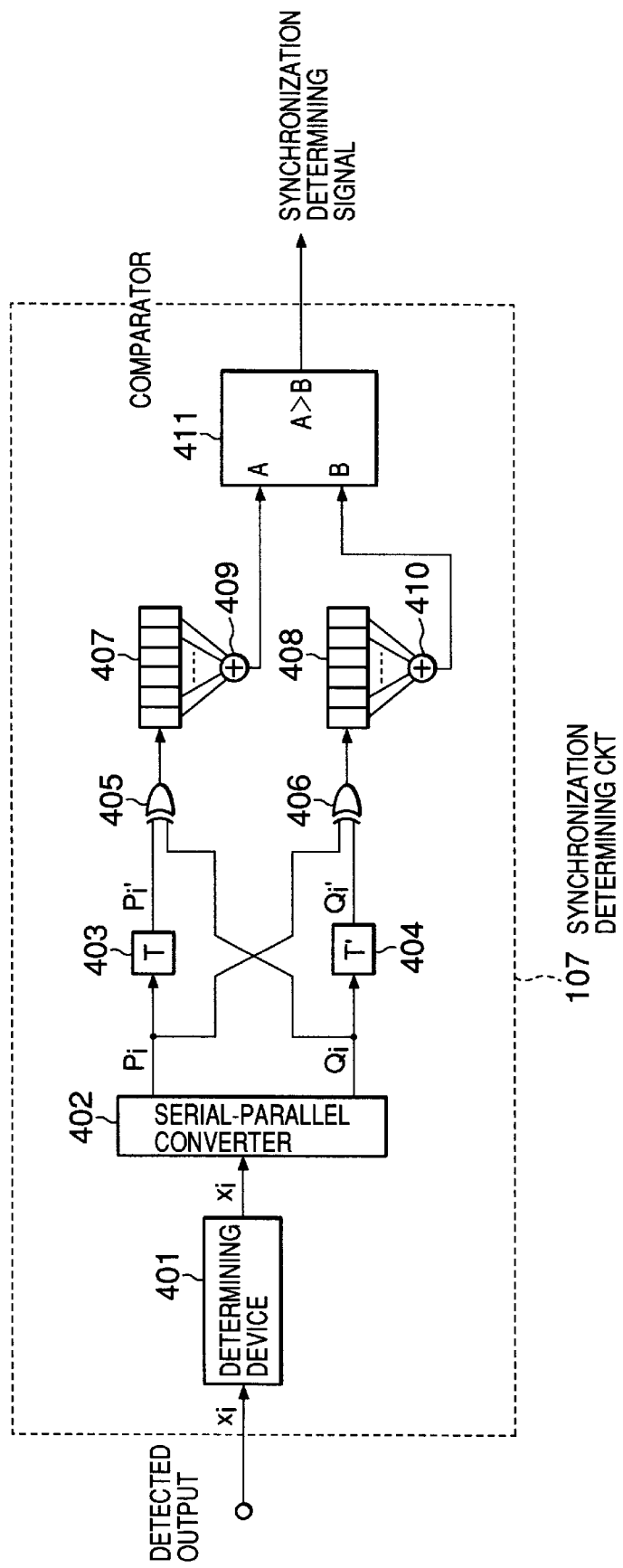
FIG. 4 is a structural diagram of a synchronization determining circuit constructed in accordance with the first embodiment.

FIG. 1(a) and 1(b) are structural diagrams of a communication system constructed in accordance with a first embodiment of the present invention. In FIG. 1(a) and 1(b), 101 denotes a modulating section in a transmitting device, 102 and 109 denote delay devices each having a delay time T equal to N bits, 103 denotes a parallel-serial converter, 104 denotes a binary phase shift keying (BPSK) modulator, 105 denotes a demodulating section in a receiving device, 106 denotes a detecting circuit, 107 denotes a synchronization determining circuit, 108 denotes a serial-parallel converter, 110 denotes a combiner and 111 denotes a determining device.

The delay devices 102 and 109 each serve as delaying means, the parallel-serial converter 103 serves as multiplexing means, the BPSK modulator 104 serves as modulating means, the serial-parallel converter 108 serves as separating means, the combiner 110 serves as combining means, and the determining device 111 serves as determining means.

As shown in FIG. 1(*a*) and 1(*b*), an input terminal of the modulating section 101 is connected to the delay device 102 and the parallel-serial converter 103. The parallel-serial converter 103 is connected to the BPSK modulator 104. The BPSK modulator 104 is connected to an output terminal of the modulating section 101. An input terminal of the demodulating section 105 is connected to the detecting circuit 106. Output of the detecting circuit 106 is connected to the synchronization determining circuit 107 and to the serial-parallel converter 108. One output of the serial-parallel converter 108 is connected to the delay device 109, while a second output of the serial-parallel converter 108 is connected to a first input of the combiner 110. The output of the delay device 109 is connected to a second input of the combiner 110, and output of the combiner 110 is connected to the determining device 111.

In a system such as that depicted in FIG. 1(*a*) and 1(*b*), sound or video data are converted by means of a sound encoder or the like (not shown) into a digital data sequence for purposes of transmission. The data sequence is used as input to the modulating section 101. As shown in FIGS. 1(*a*) and 1(*b*), one input of the parallel-serial converter 103 receives the input data sequence directly, while the second input of the parallel-serial converter 103 receives the data sequence after it has been given a delay of time T (equal to N bits) by the delay device 102. The parallel-serial converter 103 converts the two parallel input data sequences into a serial data sequence having a data rate twice that of the input data sequence.

FIG. 2 illustrates operation of the parallel-serial converter 103. In FIG. 2, $\{a\ i\}$ (i an integer) represents a data sequence input to the modulating section 101, $\{b\ i\}$ represents a data sequence derived by delaying $\{a\ i\}$ by N bits (corresponding to the delay time T of the delay device 102), and $\{e\ i\}$ represents an output sequence generated by the parallel-serial converter 103 using input signals $\{a\ i\}$ and $\{b\ i\}$. In the figure, the symbols a −1, a 0, a 1, etc. represent data strings consisting of one or more bits. As shown in FIG. 2, the relationship between $\{a\ i\}$ and $\{b\ i\}$ can be expressed by the following equation:

$$b\ i = a\ i-N.$$

The output $\{e\ i\}$ of the parallel-serial converter 103 can be expressed as a function of $\{a\ i\}$ and $\{b\ i\}$ as follows:

$$e\ 2i = a\ i,$$

$$e\ 2i+1 = b\ i = a\ i-N.$$

The output of the parallel-serial converter 103 is BPSK-modulated at the BPSK modulator 104. Note that synchronization words are not added to the data sequence prior to transmission. Assuming that the modulated version of $\{e\ i\}$ is given by $\{E\ i\}$, and that (hypothetical) modulated versions of $\{a\ i\}$ and $\{b\ i\}$ are given by $\{A\ i\}$ and $\{B\ i\}$, then the following relationships are established:

$$E\ 2i = A\ i,$$

$$E\ 2i+1 = B\ i = A\ i-N.$$

The modulated sequence $\{E\ i\}$ is transmitted by means of a transmission channel after being power-amplified by a radio-frequency amplifier or the like. The transmitted sequence is received by a receiving device and used as input to the demodulating section 105. The received sequence is then power-amplified by a radio-frequency amplifier or the like and detected by the detecting circuit 106. A modulated output sequence $\{X\ i\}$ from the detecting circuit 106 is used as one input to the serial-parallel converter 108.

The serial-parallel converter 108 converts $\{X\ i\}$ into two data sequences each having a data rate half that of $\{X\ i\}$. These sequences are output on lines α and , as shown in FIG. 1(*b*). A data signal on line α is given by $\{\alpha\ i\}$, and a data sequence on line β is given by $\{\beta\ i\}$. Assuming, for simplification, that no error due to noise is present, then $\{X\ i\}$ will be equal to $\{E\ i\}$, and $\{X\ i\}$ can be expressed as a function of $\{A\ i\}$ and $\{B\ i\}$ as follows:

$$X\ 2i = A\ i,$$

$$X\ 2i+1 = B\ i = A\ i-N.$$

The sequences $\{\alpha\ i\}$ and $\{\beta\ i\}$ derived by serial-parallel converting $\{X\ i\}$ can then be expressed by the following equations:

$$\alpha i = X2i+m,$$

$$\beta i = X2i+1+m\ (m\ \text{an integer}).$$

The relationship between $\{\alpha\ i\}$ and $\{\beta\ i\}$ depends on whether the term m in the above equations is odd or even. The exact value of m will be determined by the time delay introduced by the serial-parallel converter 108. For mathematical simplification, let m=0 represent all cases where m is even, and let m=1 represent all cases where m is odd. Thus, $\{\alpha\ i\}$ and $\{\beta\ i\}$ will be in one of two states, state ① or state ②(corresponding to m=0 and m=1, respectively), depending upon the data conversion timing of the serial-parallel converter 108.

Figure 3:
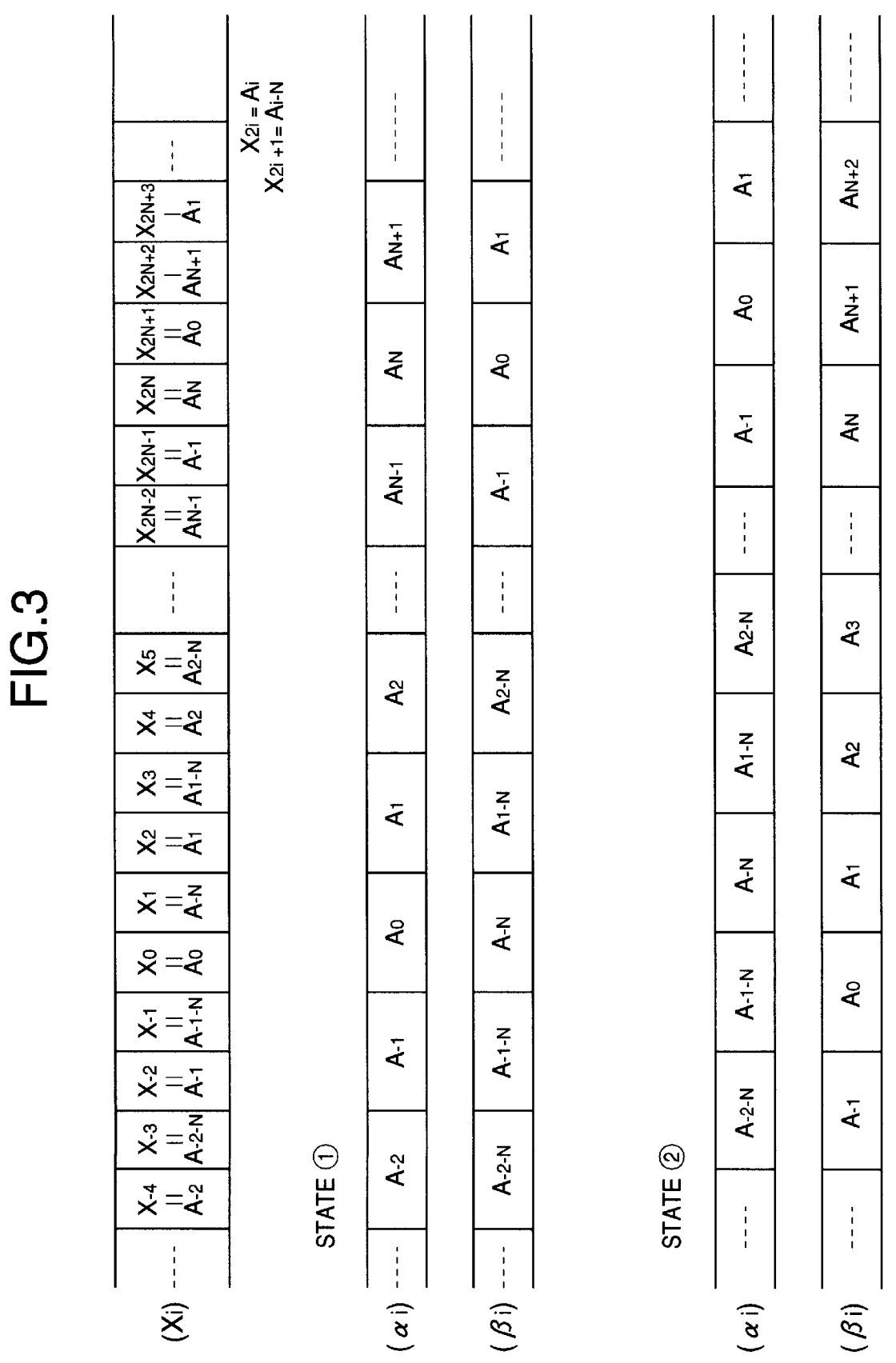

FIG. 3 depicts the input $\{X\ i\}$ and the outputs $\{\alpha\ i\}$ and $\{\beta\ i\}$ of the serial-parallel converter 108. First assuming that state ①(m=0) exists, $\{\alpha\ i\}$ and $\{\beta\ i\}$ can be expressed as follows:

$$\alpha\ i = X\ 2i = A\ i,$$

$$\beta\ i = X\ 2i+1 = A\ i-N.$$

Also, because $\{\alpha\ i\}$ is delayed by time T (equal to N-bits) at the delay device 109 (see FIG. 1(*a*) and 1(*b*)), the data sequence output from the delay device 109, given by $\{\alpha'\ i\}$, can be expressed as follows:

$$\alpha'\ i = \alpha\ i-N = A\ i-N.$$

Thus, in state ①, the data sequences $\{\alpha'\ i\}$ and $\{\beta\ i\}$, which serve as input to the combiner 110, are identical to each other and equal to $\{A\ i-N\}$. As a result, the two sequences $\{\alpha'\ i\}$ and $\{\beta\ i\}$ can be properly combined, and the original data sequence $\{a'\ i\}$ can be reconstructed.

Next assuming that state ②(m=1) exists, $\{\alpha\ i\}$ and $\{\beta\ i\}$ can be expressed as follows:

$$\alpha\ i = X\ 2i+1 = A\ i-N,$$

$$\beta\ i = X\ 2i+2 = A\ i+1.$$

Therefore, the data sequence $\{\alpha'\ i\}$ output from the delay device 109 can be expressed as follows:

α' i=α i-N=A i-2N.

Thus, in state ②, the data sequences {α' i} and {β i} input to the combiner 110 are not identical and cannot be correctly combined. Therefore, the conversion timing of the serial-parallel converter 108 must be adjusted so that state ① is maintained. This is accomplished by the synchronization determining circuit 107.

FIG. 4 is a structural diagram of the synchronization determining circuit 107.

In FIG. 4, 401 denotes a determining device, 402 denotes a serial-parallel converter, 403 denotes a delay device having an associated delay time T equal to N bits, 404 denotes a delay device having a delay time T' equal to (N+1) bits, 405 and 406 denote exclusive OR circuits, 407 and 408 denote shift registers, 409 and 410 denote adders, and 411 denotes a comparator.

The serial-parallel converter 402 functions as separating means, and the delay devices 403 and 404 each function as delaying means. Further, the exclusive OR circuits 405 and 406 each function as comparing means, and the comparator 411 functions as synchronization determining means. Also, the shift registers 407 and 408 and the adders 409 and 410 each function as adding means, and the shift registers 407 and 408 each function as storing means.

Operation of the synchronization determining circuit 107 will be explained with reference to FIG. 4. When the output sequence {X i} of the detecting circuit 106 is input to the synchronization determining circuit 107, the determining device 401 generates hard-decision data (i.e., 1 or 0). Thus, an output sequence {x i} of the determining device 401 represents a demodulated version of {X i}. The output {x i} of the determining device 401 is input to the serial-parallel converter 402 to be separated into two data sequences {P i} and {Q i} each having a data rate half that of the input data sequence {x i}. It is assumed that the conversion timing of the serial-parallel converter 402 is synchronized with that of the serial-parallel converter 108.

As shown in FIG. 4, the sequence {P i} is input directly to the exclusive OR circuit 406 and input indirectly to the exclusive OR circuit 405 after being delayed by a time T at the delay device 403. At the same time, the sequence {Q i} is input directly to the exclusive OR circuit 405 and input indirectly to the exclusive OR circuit 406 after being delayed by a time T' at the delay device 404. Assuming that a data period is given by τ, T and T' can be expressed as follows:

$$T = N\tau,$$

$$T' = T + \tau = (N+1)\tau.$$

Further, assuming, for simplicity that no error due to noise is present, the output sequence {x i} of the determining circuit 401 is equal to the output {e i} of the parallel-serial converter 103 of the transmitting device, and the following equation is established:

$$x_i = e_i.$$

Accordingly, {x i} can be expressed by the original data sequence {a i} and the delayed data sequence {b i} (derived by delaying {a i} by time T at the delay device 102) as follows:

$$x\ 2i = a\ i,$$

$$x\ 2i+1 = b\ i = a\ i-N.$$

The outputs {P i} and {Q i} derived by serial-parallel converting {x i} can be expressed as follows:

$$P\ i = x\ 2i+m,$$

$$Q\ i = x\ 2i+1+m\ (m\ \text{an integer}).$$

The relationship between {P i} and {Q i} will depend on whether the term m in the above equations is odd or even. The exact value of m will be determined by the time delay introduced by the serial-parallel converter 402. Again, for simplification, let m=0 represent all cases where m is even, and let m=1 represent all cases where m is odd. Thus, {P i} and {Q i} will be in one of two states, state ① or state ② (corresponding to m=0 and m=1, respectively), depending upon the data conversion timing of the serial-parallel converter 402.

FIG. 5 depicts the input {x i} and the outputs {P i} and {Q i} of the serial-parallel converter 402. First assuming that state ①(m=0) exists, {P i} and {Q i} can be expressed as follows:

$$P\ i = x\ 2i = a\ i,$$

$$Q\ i = x\ 2i+1 = a\ i-N.$$

Thus, assuming that the data derived by delaying {P i} by time T at the delay device 403 is given by {P' i}, and assuming that the data derived by delaying {Q i} by time T' at the delay device 404 is given by {Q' i}, the inputs {P' i} and {Q i} of the exclusive OR circuit 405 and the inputs {P i} and {Q' i} of the exclusive OR circuit 406 can be expressed as follows:

$$P'\ i = P\ i - N \quad = a\ i - N,$$
$$Q\ i \quad\quad\quad\quad = a\ i - N,$$
$$P\ i \quad\quad\quad\quad = a\ i,$$
$$Q'\ i = Q\ i - N - 1 \quad = a\ i - 2N - 1.$$

Next assuming that state ②(m=1) exists, {P i} and {Q i} can be expressed as follows:

$$P\ i = x\ 2i+1 = a\ i - N$$

$$Q\ i = x\ 2i+2 = a\ i+1$$

Thus, the inputs {P' i} and {Q i} of the exclusive OR circuit 405 and the inputs {P i} and {Q' i} of the exclusive OR circuit 406 can be expressed as follows:

$$P'\ i = P\ i - N \quad = a\ i - 2N$$
$$Q\ i \quad\quad\quad\quad = a\ i + 1$$
$$P\ i \quad\quad\quad\quad = a\ i - N$$
$$Q'\ i = Q\ i - N - 1 \quad = a\ i - N$$

As just described, the inputs of the exclusive OR circuit 405 are identical sequences in state ①, and the inputs of the exclusive OR circuit 406 are identical sequences in state ②. In those instances, the output of the exclusive OR circuits 405 and 406 are fixed at 0. In contrast, because the inputs of the exclusive OR circuit 406 in state ① and the inputs of the exclusive OR circuit 405 in state ② are not identical sequences, the exclusive OR circuits 405 and 406 in those instances output 0 when the input data are equal and output 1 when the input data are different. In other words, the exclusive OR circuits 405 and 406 in those instances output values of 0 and 1 at random.

The outputs of the exclusive OR circuits 405 and 406 are input to the M-stage shift registers 407 and 408, respectively, and the resulting M-bit moving-added values are output to the adders 409 and 410, respectively. Outputs SAi and SBi of the adders 409 and 410 can be expressed as follows:

$$S^{A}i = \sum_{j=i-M+1}^{i} Pj' \oplus Qj$$

$$S^{B}i = \sum_{j=i-M+1}^{i} Pj \oplus Qj'$$

Figure 6:
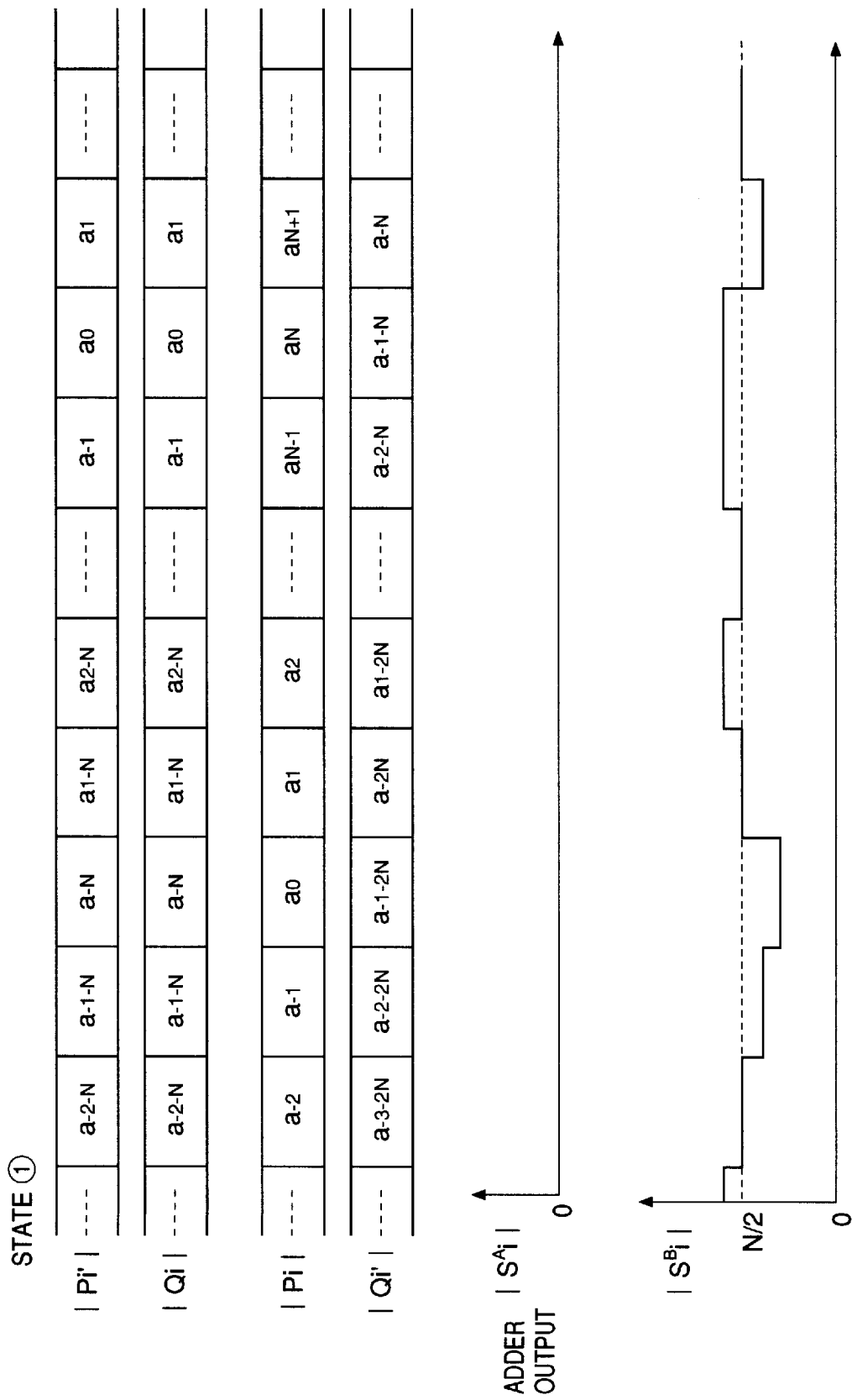
FIG. 6 is a diagram showing input data of exclusive OR circuits and adder outputs within the synchronization determining circuit of FIG. 4.
Figure 7:
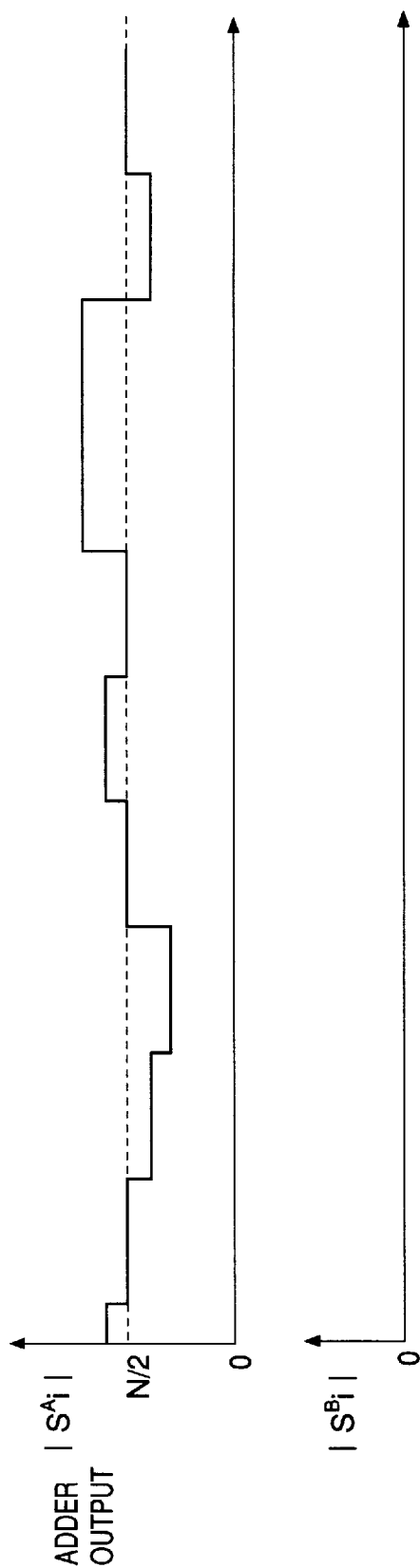
FIG. 7 is a diagram showing input data of exclusive OR circuits and adder outputs within the synchronization determining circuit of FIG. 4.

If the output of the exclusive OR circuit is 0, the adder output will also be 0. In contrast, if the output of the exclusive OR circuit is random, the adder will output random values having a mean value corresponding to half the number of stages M of the shift register. FIG. 6 depicts input data of the exclusive OR circuits 405 and 406 and time-domain variations of the outputs SAi and SBi of the adders 409 and 410 for state ①. FIG. 7 depicts input data of the exclusive OR circuits 405 and 406 and time-domain variations of the outputs SAi and SBi of the adders 409 and 410 for state ②.

As shown in FIGS. 6 and 7, in state ①, adder 409 outputs 0 while adder 410 outputs random values having a mean value as described above. In state ②, adder 410 outputs 0, while adder 409 outputs random values. Thus, by comparing the relative magnitudes of the adder outputs, the present state (① or ②) of the serial-parallel converter 402 can be determined.

The output SAi of the adder 409 is connected to an input A of the comparator 411, and the output SBi of the adder 410 is connected to an input B of the comparator 411. The output of the comparator 411, referred to as the synchronization determining signal Co, will depend upon the relative magnitudes of A and B:

$$Co = \begin{cases} 0 & (A \leq B) \\ 1 & (A > B) \end{cases}$$

Specifically, the synchronization determining signal Co will be 0 when the serial-parallel converter 402 is in state ①, and Co will be 1 when the converter 402 is in state ②. Because the conversion timings of the serial-parallel converters 108 and 402 are the same, the serial-parallel converters 108 and 402 will always be in the same state ((① or ②). Thus the synchronization determining signal Co can be used to control the conversion timing of serial-parallel converter 108.

The synchronization determining signal Co is input to an output-selecting input of the serial-parallel converter 108. The serial-parallel converter 108 continues to output as it is when Co=0 (thus remaining in state ①), but adjusts the serial-parallel conversion timing when Co=1 (thus shifting from state ② to state ①). As a result, even if the conversion timinof the serial-parallel converter 108 is initially incorrect (i.e., state ②), the synchronization determining circuit 107 will immediately adjust it by means of the synchronization determining signal Co so that the correct serial-parallel conversion timing (i.e., state ①) will be achieved.

Figure 8:
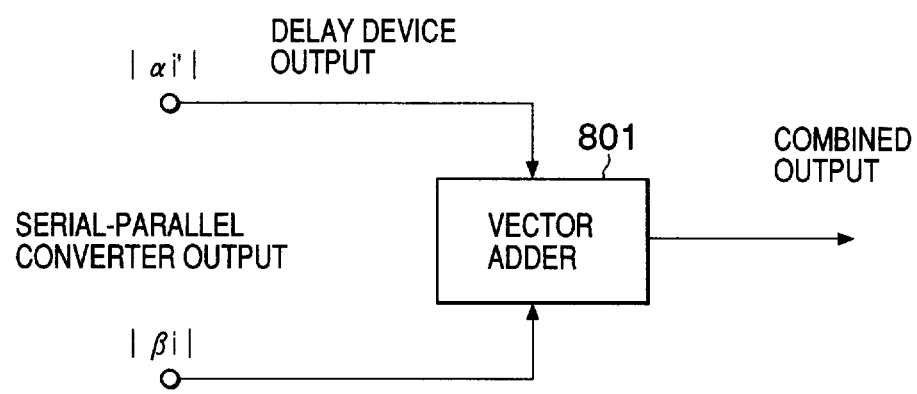
FIG. 8 is a structural diagram of a combiner constructed in accordance with the first embodiment.

Because the conversion timing of the serial-parallel converter 108 is always in state ①, the sequences {α' i} and {β i} input to the combiner 110 will be properly synchronized in time, as is required for proper data synthesis and data reconstruction. FIG. 8 is a structural diagram of an equal-gain combiner 110, wherein 801 denotes a vector adder. The sequences {α' i} and {β i} which are input to the combiner 110 are input directly to the vector adder 801. There they are added with equal gain and the result is input to the determining device 111. Output of the determining device 111 is computed based on an in-phase component Re of its input as follows:

$$Da = \begin{cases} 0 & (Re \geq 0) \\ 1 & (Re < 0) \end{cases}$$

The sequence of determination values Da can then be decoded by a sound decoder or the like and output as sound or video data.

As just described, the first embodiment of the present invention provides a synchronization determining circuit with a serial-parallel converter functioning as a separating means, for separating particularly the inputted multiplex data stream to output the plurality of data streams, a delay device, as a delaying means, for delaying at least one of the plurality of data streams outputted from the serial-parallel converter by a given time, an exclusive OR circuit or the like, as a comparing means, for comparing the data stream delayed by the delay device and the data stream outputted from the serial-parallel converter without being delayed by this delay device so as to output comparison data, and a comparator or the like, as a synchronization determining means, for determining the synchronization state of the inputted multiplex stream based on the comparison data.

Because synchronization can be established without using synchronization words, transmission efficiency is improved over the prior art. Further, because the present invention does not have an associated feedback loop delay, incorrectly decoded sequences are not generated for a period of time before synchronization is established. In the foregoing description of the first embodiment, two exclusive OR circuits 405 and 406 are provided as the comparing means in the synchronization determining circuit 107. However, the contemplated comparing means is not limited to that particular structure. For example, synchronization can also be established using only one exclusive OR circuit 405. In that case, an adder 409 output approximating 0 would indicate state ①, while a non-zero adder 409 output would indicate state ②. Use of a single exclusive OR circuit allows for a reduction in overall circuit scale.

Also note that the number of stages M in the shift registers 407 and 408 is arbitrary. Precision of the synchronization decision can be enhanced by increasing the number of stages, while overall process delay can be reduced by decreasing the number of stages.

Finally note that the structure of the present invention is not limited to the case in which only one original data sequence (i.e., {a i} above) and only one delayed version (i.e., {b i} above} are multiplexed and transmitted. In fact, any number of original and delayed signals can be used so long as appropriate hardware is provided.

Second Embodiment

Although the above description contemplates only a BPSK modulation mode, other modulation modes are contemplated. For example, quadrature phase shift keying (QPSK), eight phase shift keying (8PSK), FSK, or MSK may be used.

Third Embodiment

In the synchronization determining circuit 107 of the first embodiment, the adder sums the output of all taps of the shift register. The synchronization determining circuit of the present invention is not limited to that particular structure. For example, as shown in FIG. 9(a), an integrator including an adder 901 and a delay device 902 having a delay time equal to a data term D can be provided following the shift register 407, 408. An input Isr of the shift register is added at the integrator, while an output Osr of the final stage of the shift register is subtracted at the integrator. Assuming 0 is input to the shift register as an initial value, and assuming the i-th output of the adder 901 is given by S i, the following relationship is established:

$$S\ i = S\ i{-}1 + Isr - Osr$$

This structure yields a result similar to that of the first embodiment. However, because the number of terms being summed is reduced, the adder circuit can be significantly simplified.

Fourth Embodiment

An alternative to the third embodiment will be described with respect to FIG. 9(b). As shown in the figure, results similar to those of the first and third embodiments can be achieved using an up/down counter 903. An exclusive OR operation between the input Isr and output Osr of the shift register 407, 408 is used as an enabling signal for the up/down counter 903, and Isr is used as an up/down signal for the up/down counter 903. Because the inputs of the shift registers 407, 408 are either 0 or 1, there are four possible combinations of Isr and Osr, and the corresponding exclusive OR operation Ex between Isr and Osr can be expressed as follows:

$$(Isr, Osr) = \begin{cases} (0,0) \\ (0,1) \\ (1,0) \\ (1,1) \end{cases} Ex = \begin{cases} 0 \\ 1 \\ 1 \\ 0 \end{cases}$$

If Isr=Osr, then Ex=0, the enabling signal E of the up/down counter 903 is 0, and the added output of the up/down counter 903 does not change. On the other hand, if Isr≠Osr, then Ex=1, and the enabling signal E of the up/down counter 903 is 1. Thus, if Isr=1, then the up/down signal U/D is 1, and the counter counts up. However, if Isr=0, then the up/down signal U/D is 0 and the counter counts down. Assuming the i-th output of the up/down counter 903 is given by S i, then the following relationship is established:

$$S_i = \begin{cases} S_{i-1} + 1 & (Isr = 1) \\ S_{i-1} - 1 & (Isr = 0) \end{cases}$$

Thus, operation similar to the adder in the first embodiment is achieved. However, because all taps of the shift registers 407, 408 need not be added, the required circuitry is significantly simplified.

Fifth Embodiment

In the first embodiment, the combiner 110 performs equal gain synthesis. An alternative is maximum ratio synthesis. FIG. 10 shows a structural diagram of an alternative combiner 110 used to carry out maximum ratio synthesis. In FIG. 10, 1001 and 1002 denote absolute value detectors, 1003 and 1004 denote multipliers, and 1005 denotes a vector adder.

Sequences $\{\alpha'\ i\}$ and $\{\beta\ i\}$, which are input to the combiner 110 are input to the absolute value detectors 1001 and 1002, respectively. The resulting absolute value sequences $|\alpha'\ i|$ and $|\beta\ i|$ are then multiplied by $\{\alpha'\ i\}$ and $\{\beta\ i\}$, respectively, at the multipliers 1003 and 1004. The multiplier outputs are then input to the vector adder 1005 to be summed, the resulting sum being passed to the determining device 111. The effect of multiplying each sequence by its own absolute value is to weight the vector summation such that the sequence having the larger SN ratio will be weighted more heavily.

As shown in FIG. 11, assuming that $|\alpha'\ i|=2$ and $|\beta\ i|=1$, the inputs of the vector adder 105 are such that $\{\beta\ i\}$ is weighted by a factor of one, while $\{\alpha'\ i\}$ is weighted by a factor of 2 (shown by a thick line in the figure). Thus, as shown, output of the vector adder 1005 will reflect a summation which is weighted in favor of $\{a'\ i\}$. By constructing the combiner 110 in this way, performance is enhanced as compared with the equal gain synthesis approach.

Sixth Embodiment.

Figure 12:
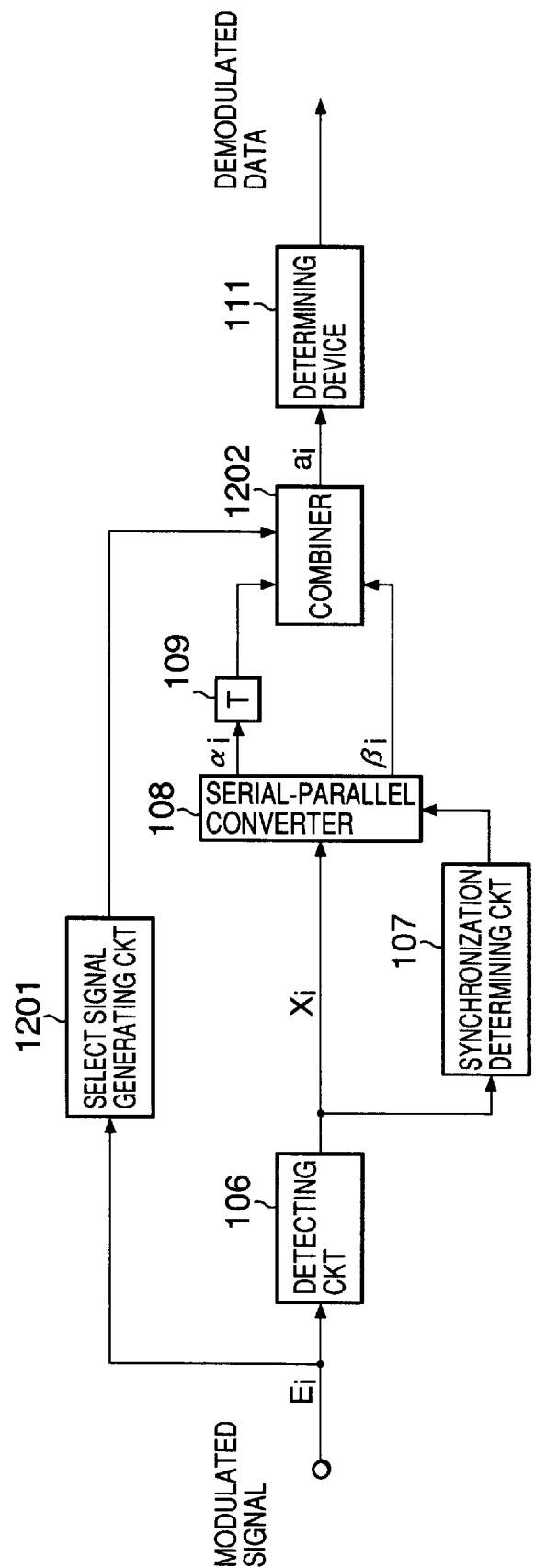
FIG. 12 is a structural diagram of a demodulating section constructed in accordance with a sixth embodiment of the present invention.

FIG. 12 depicts an alternative to the demodulating section 105 of the first embodiment. The demodulating section of FIG. 12 is constructed to carry out selective synthesis. In the figure, 1201 denotes a select signal generating circuit and 1202 denotes a combiner. Elements of FIG. 12 which correspond to identical elements of FIG. 1 are assigned identical numbers, and re-explanation of those elements is omitted.

Figure 13:
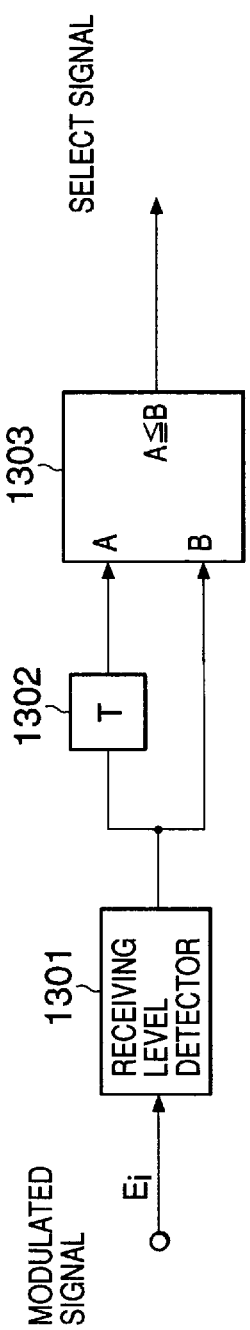
FIG. 13 is a structural diagram showing a structure of a select signal generating circuit constructed in accordance with the sixth embodiment.

Operation of the select signal generating circuit 1201 and the combiner 1202 will be described with reference to FIG. 13, a structural diagram of the select signal generating circuit 1201. In FIG. 13, 1301 denotes a receiving level detector, 1302 denotes a delay device having a delay time equal to an N-bit delay term T, and 1303 denotes a comparator. The received modulated signal is input to the select signal generating circuit 1201, and a receiving level of that signal is detected at the receiving level detector 1301.

The detected receiving level is input directly into input B of the comparator 1303, and input indirectly into input A of the comparator 1303 after being delayed by the N-bit delay term T at the delay device 1302. The comparator 1303 outputs a signal indicating the larger input level. Specifically, an output Cr of the comparator 1303 can be expressed as follows:

$$C_r = \begin{cases} 1 & (A \leq B) \\ 0 & (A > B) \end{cases}$$

Figure 14:
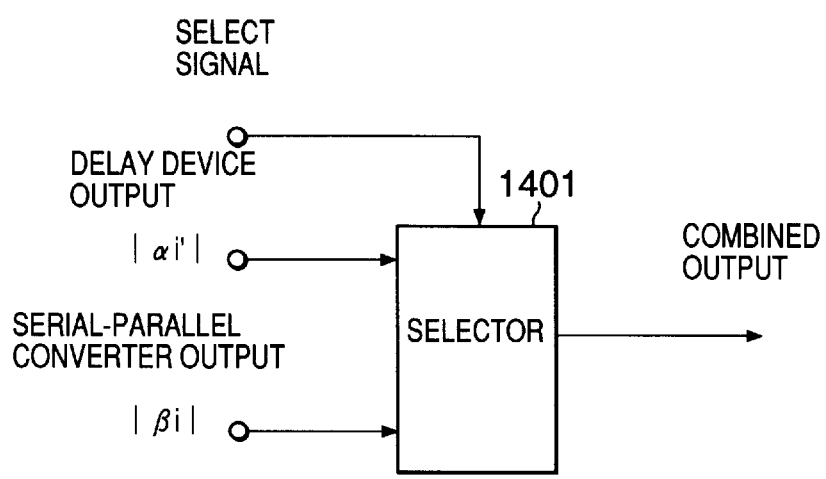
FIG. 14 is a structural diagram of a combiner constructed in accordance with the sixth embodiment.

The select signal Cr output by the comparator 1303 is input to the combiner 1202. FIG. 14 is a structural diagram of the combiner 1202. In FIG. 14, 1401 denotes a selector. The selector 1401 outputs $\{\alpha'\ i\}$ when the select signal is 0 and outputs $\{\beta\ i\}$ when the select signal is 1. This output is passed to the determining device 111 for demodulation. Thus, selective synthesis is achieved by selecting and demodulating the sequence ($\{\alpha'\ i\}$ or $\{\beta\ i\}$) having larger magnitude. Note that the circuitry required to construct a combiner 110 which performs selective synthesis is simple as compared with that required for equal gain synthesis.

Seventh Embodiment

Figure 15A:
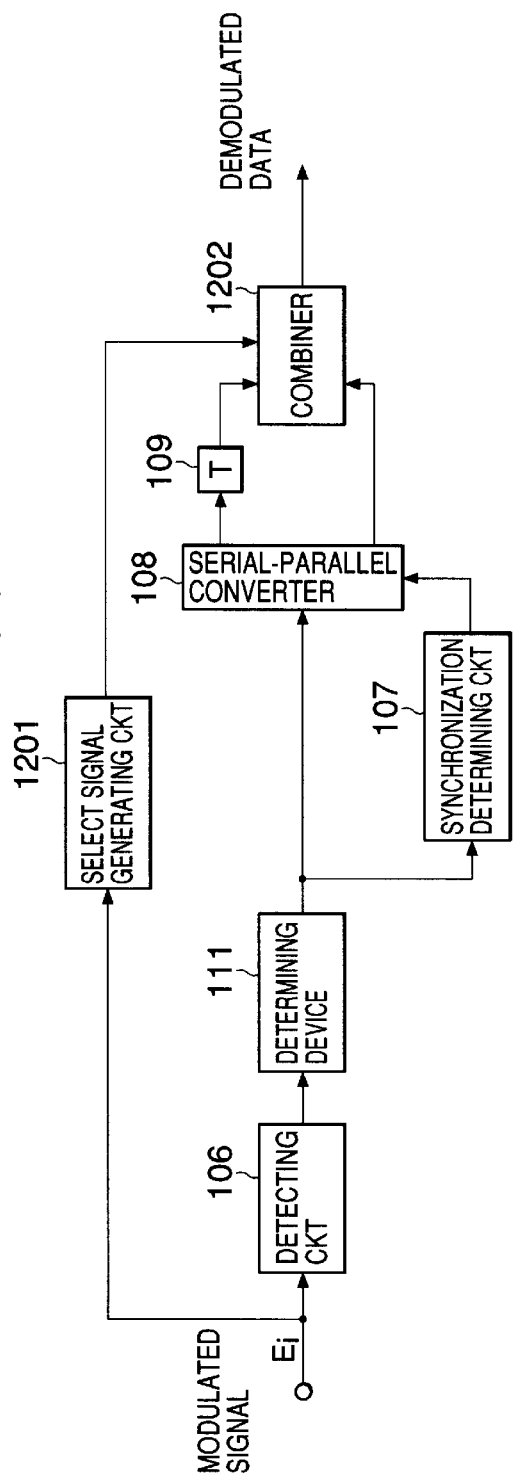
FIGS. 15(a) and 15(b) are structural diagrams of a communication system constructed in accordance with a seventh embodiment of the present invention.
Figure 15B:
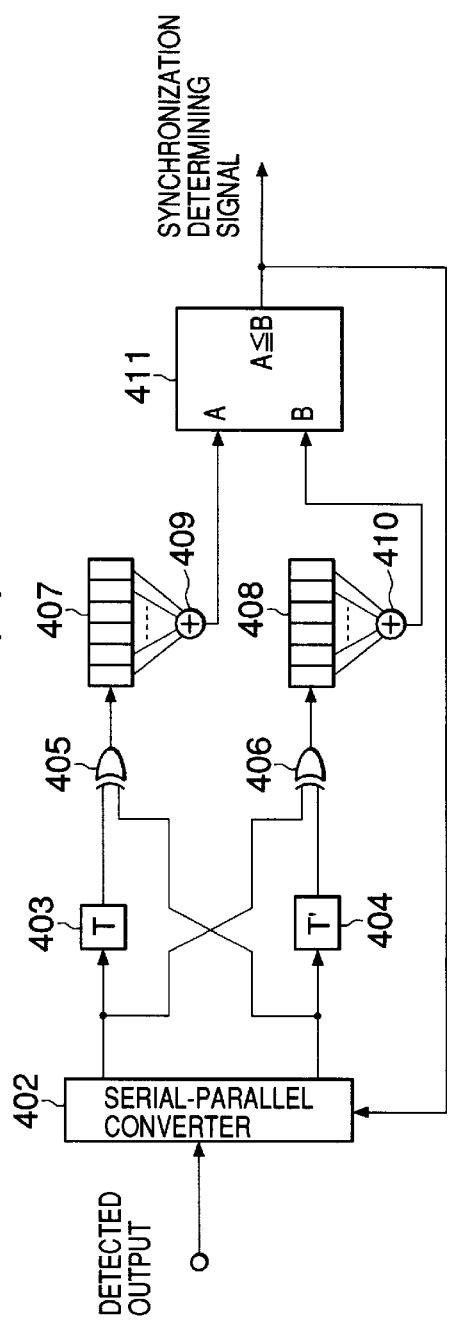

In the sixth embodiment, data determination is performed after selective synthesis. However, this need not be the case. For example, in the receiving device shown in FIG. 15(a), data determination is performed by means of a determining device 111 positioned immediately after the detecting circuit 106. In this case, as shown in FIG. 15(b), the determining device in the synchronization determining circuit 107 may be omitted, and the overall number of elements can be reduced.

Eighth Embodiment

Figure 16:
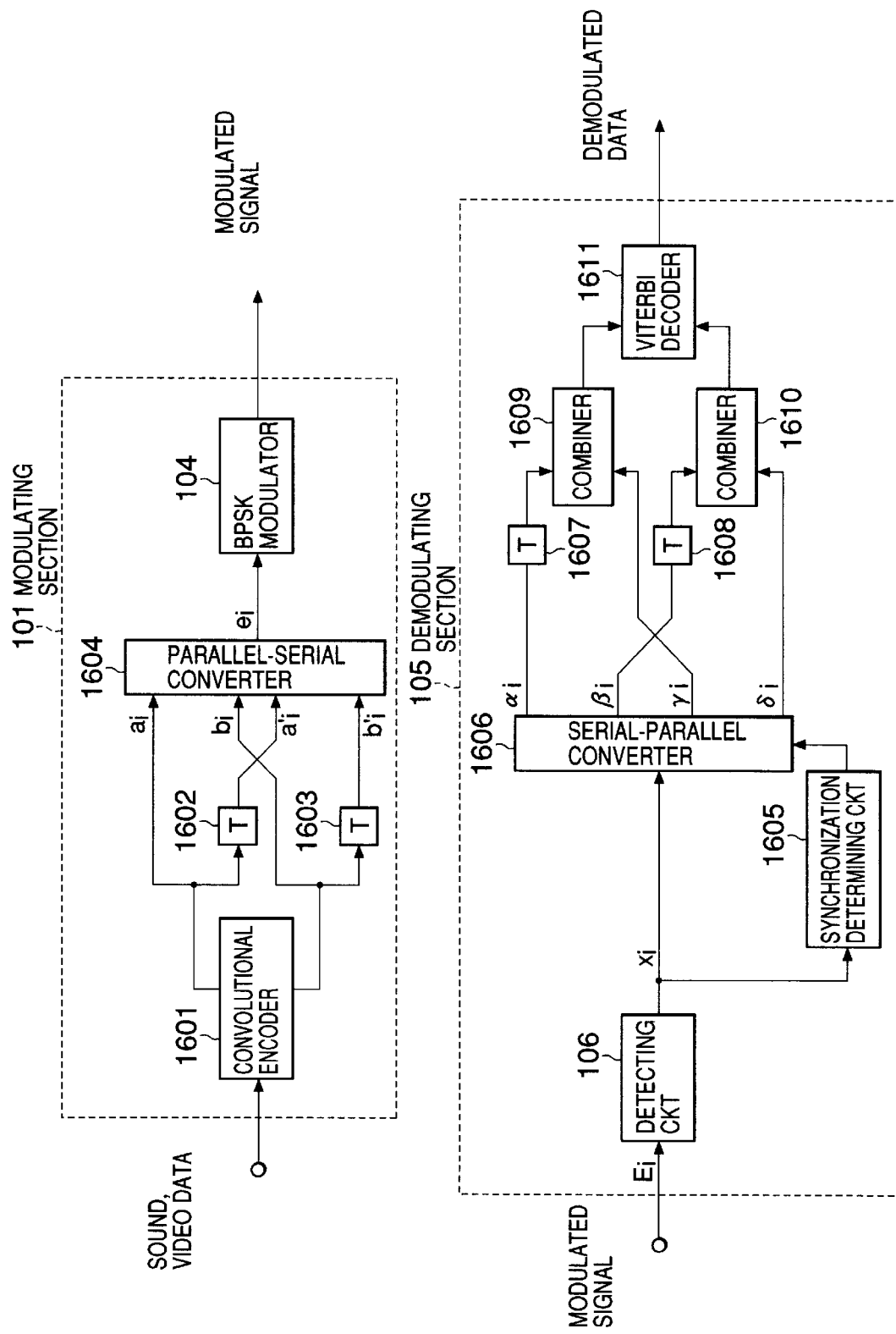
FIG. 16 is a structural diagram of a communication system constructed in accordance with an eighth embodiment of the present invention.

FIG. 16 is a structural diagram of a communication system constructed in accordance with an eighth embodiment of the present invention. In FIG. 16, 1601 denotes a convolutional encoder, 1602, 1603, 1607 and 1608 denote delay devices each having a delay time equal to an N-bit delay term T, 1604 denotes a parallel-serial converter, 1605 denotes a synchronization determining circuit, 1606 denotes a serial-parallel converter, 1609 and 1610 denote combiners, and 1611 denotes a Viterbi decoder. Elements of FIG. 16 which correspond to identical elements of FIG. 1 are assigned identical numbers, and re-explanation of those elements is omitted.

As in the first embodiment, sound or video data are converted into a digital signal by a sound encoder or the like, resulting in a data sequence to be transmitted. The data sequence to be transmitted is input to the modulating section 101 and convolutionally encoded at the convolutional encoder 1601 having a coding rate R=½. Two data sequences are output by the convolutional encoder 1601. Each sequence is input directly to the parallel-serial converter 1604, and input indirectly to the parallel-serial converter 1604 after being delayed at the delay devices 1602 and 1603, each delay device having a delay time equal to an N-bit delay term T. The parallel-serial converter 1604 converts the four parallel input data sequences into a serial data sequence having a data rate four times that of the input data sequences.

Figure 17:
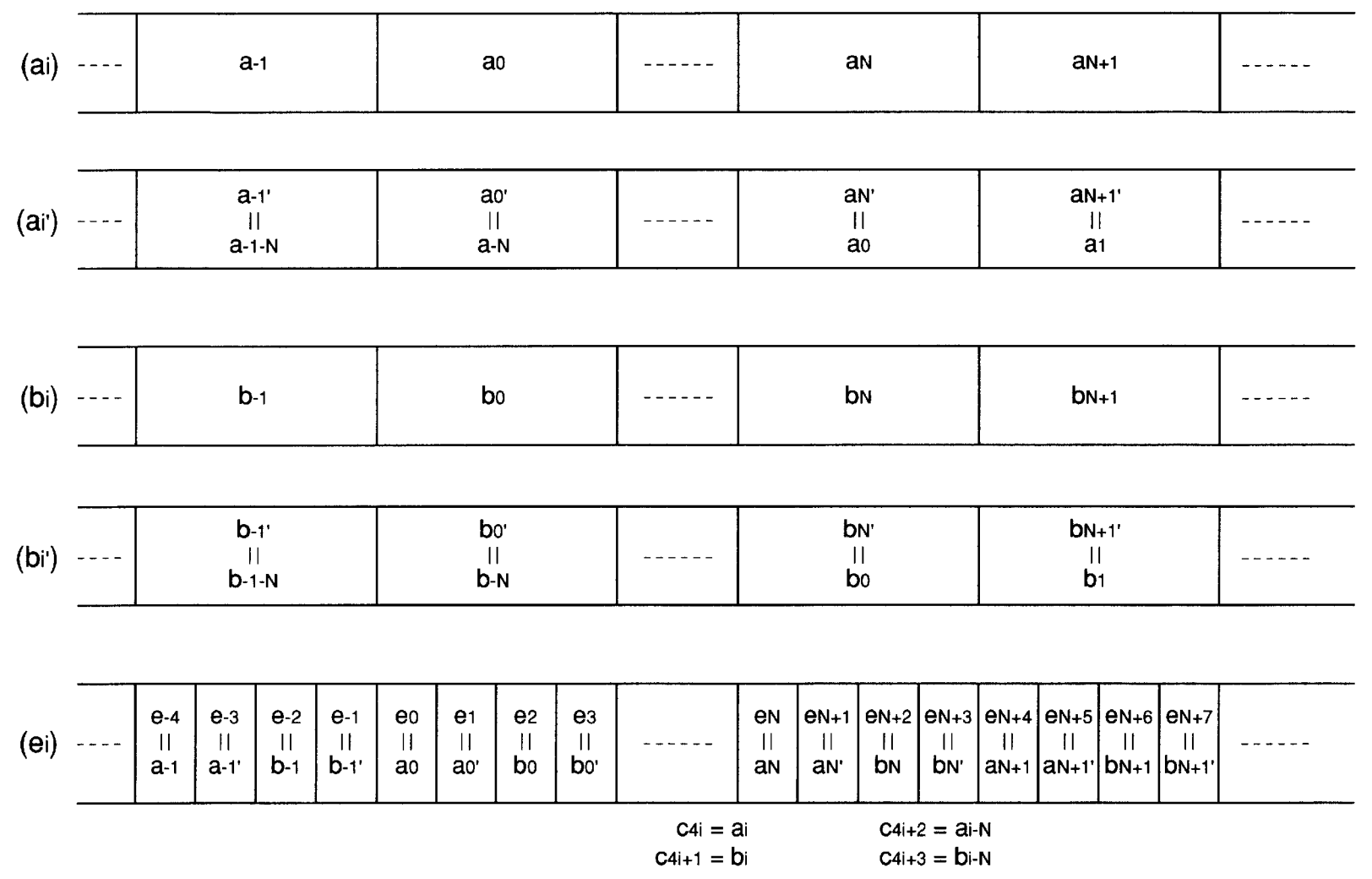

Operation of the parallel-serial converter 1604 will be explained with reference to FIG. 17, a diagram showing time-domain variations of the convolutionally encoded data sequences {a i} and {b i}, the data sequences {a' i} and {b' i} derived by delaying {a i} and {b i} by the delay time T at the delay devices 1602 and 1603, and the output {e i} of the parallel-serial converter 1604. As shown in FIG. 17, relationships between {a i} and {a' i} and between {b i} and {b' i} can be expressed by the following equations:

a' i=a i−N b' i=b i−N

The output {e i} of the parallel-serial converter 1604 can be expressed as a function of {a i}, {a' i}, {b i} and {b' i} as follows:

$$e_{4i} = a_i$$
$$e_{4i+1} = b_i$$
$$e_{4i+2} = a'_i = a_{i-N}$$
$$e_{4i+3} = b'_i = b_{i-N}$$

The output of the parallel-serial converter 1604 is BPSK-modulated at the BPSK modulator 104. Let the modulated version of {e i} be given by {E i}, let the (hypothetical) modulated versions of {a i} and {b i} be given by {A i} and {B i}, and let the (hypothetical) modulated versions of {a' i} and {b' i} be given by {A' i} and {B' i}. The sequences {A i}, {B i}, {A' i} and {B' i} are called parallel transmission sequences. The following relationships can be established between {E i}, {A i}, {B i}, {A' i}, and {B' i}:

$$E_{4i} = A_i$$
$$E_{4i+1} = B_i$$
$$E_{4i+2} = A'_i = A_{i-N}$$

-continued $$E_{4i+3} = B'_i = B_{i-N}$$

The modulated sequence {E i} is transmitted after being power-amplified by a radio-frequency amplifier or the like. The transmitted electric wave is received by the receiving device by means of a transmission channel, input to the demodulating section 105, and detected by the detecting circuit 106 after being power-amplified by a radio-frequency amplifier or the like. The output {X i} of the detecting circuit 106 is input to the serial-parallel converter 1606.

{X i} is input to the serial-parallel converter 1606 to be converted into four data sequences each having a data rate one-fourth that of {X i}. The four resulting sequences {α i}, {β i}, {γ i} and {δ i} are parallel reception sequences. Assuming for simplification that no error due to noise is present, then {X i} is equal to {E i}, and {X i} can be expressed by the parallel transmission sequences as follows:

$$X_{4i} = A_i$$
$$X_{4i+1} = B_i$$
$$X_{4i+2} = A'_i = A_{i-N}$$
$$X_{4i+3} = B'_i = B_{i-N}$$

The parallel reception sequences derived by serial-parallel converting {X i} can then be expressed by the following equations:

$$\alpha_i = X_{4i+m}$$
$$\beta_i = X_{4i+1+m}$$
$$\gamma_i = X_{4i+2+m}$$
$$\delta_i = X_{4i+3+m} \text{ ($m$ an integer)}$$

The relationships between {α i}, {β i}, {γ i} and {δ i} are determined by the value of m, which is determined by the delay introduced by the serial-parallel converter 1606. There are four cases which must be considered, namely m=4n+μ (where n is an integer, and μ=0, 1, 2, or 3). Note that the corresponding relationships between {α i}, {β i}, {γ} and {δ i} do not change so long as μ remains constant, even when n differs. Accordingly, all cases can be represented by setting n equal to 0. Thus, the parallel reception sequences {α i}, {β i}, {γ i} and {δ i} will take one of four states ①, ②, ③, or ④, corresponding to m=0, 1, 2, 3, respectively) depending on the conversion timing of the serial-parallel converter 1606.

FIG. 18 depicts the input {X i} and the parallel reception sequences {α i}, {β i}, {γ i} and {δ i} output by the serial-parallel converter 1606. As just described, the parallel reception sequences can take one of four states ①, ②, ③, or ④, depending on the value of m. Table 1 shows the correspondence between elements of the parallel reception sequences and elements of the parallel transmission sequences for the four possible states.

[TABLE 1]

| | α i | β i | γ i | δ i |
|---|---|---|---|---|
| State ① | A i | B i | A' i | B' i |
| State ② | B i | A' i | B' i | A i + 1 |
| State ③ | A' i | B' i | A i + 1 | B i + 1 |
| State ④ | B' i | A i + 1 | B i + 1 | A' i + 1 |

First assuming that m=0 (i.e., state ①, the parallel reception sequences {α i}, {β i}, {γ i} and {δ i} can be expressed from Table 1 as follows:

$$\alpha\ i = X\ 4i = A\ i$$
$$\beta\ i = X\ 4i + 1 = B\ i$$
$$\gamma\ i = X\ 4i + 2 = A\ i - N$$
$$\delta\ i = X\ 4i + 3 = B\ i - N$$

In order that equal sequences may be combined at the combiners 1609 and 1610, {α i} and {β i} are given a delay equal to an N-bit delay term T at the delay devices 1607 and 1608, respectively. If output sequences of the delay devices 1607 and 1608 are given by {α' i} and {β' i}, then {α' i} and {β' i} can be expressed as follows:

$$\alpha'\ i = \alpha\ i-N = A\ i-N$$
$$\beta'\ i = \beta\ i-N = B\ i-N$$

Thus, in state ①, the input sequences {α' i} and {δ i} of the combiner 1609 are both {A i–N}, and the input sequences {β' i} and {δ i} of the combiner 1610 are both {B i–N}. Thus proper synthesis and data reconstruction can be performed.

Now assuming that m=1 (i.e., state ②, the parallel reception sequences {α i}, {β i}, {γ i} and {δ i} can be expressed from Table 1 as follows:

$$\alpha\ i = X\ 4i + 1 = B\ i$$
$$\beta\ i = X\ 4i + 2 = A\ i - N$$
$$\gamma\ i = X\ 4i + 3 = B\ i - N$$
$$\delta\ i = X\ 4i + 4 = A\ i + 1$$

The sequence {α' i} derived by delaying {α i} by the N-bit delay term T at the delay device 1607, and the sequence {β' i} derived by delaying {β i} by the N-bit delay term T at the delay device 1608, can be expressed as follows:

$$\alpha'\ i = \alpha\ i-N = B\ i-N$$
$$\beta'\ i = \beta\ i-N = A\ i-2N$$

Thus, in state ②, although the input sequences {α' i} and {γ i} of the combiner 1609 are equal sequences, the input data {β' i} and {δ i} of the combiner 1610 are not.

Now assuming that m=2 (i.e., state ③), the parallel reception sequences {α i}, {β i}, {γ i} and {δ i} can be expressed from Table 1 as follows:

$$\alpha\ i = X\ 4i + 2 = A\ i - N$$
$$\beta\ i = X\ 4i + 3 = B\ i - N$$
$$\gamma\ i = X\ 4i + 4 = A\ i + N$$
$$\delta\ i = X\ 4i + 5 = B\ i + 1$$

The sequence {α' i} derived by delaying {α i} by the N-bit delay term T at the delay device 1607, and the sequence {β' i} derived by delaying {β i} by the N-bit delay term T at the delay device 1608, can be expressed as follows:

$$\alpha'\ i = \alpha\ i-N = A\ i-2N$$
$$\beta'\ i = \beta\ i-N = B\ i-2N$$

Thus, in state ③, the input sequences {α' i} and {γ i} of the combiner 1609 are not equal sequences, nor are the input sequences {β' i} and {δ i} of the combiner 1610 equal sequences.

Now assuming that m=3 (i.e., state ④), the parallel reception sequences {α i}, {β i}, {γ i} and {δ i} can be expressed from Table 1 as follows:

$$\alpha\ i = X\ 4i + 3 = B\ i - N$$
$$\beta\ i = X\ 4i + 4 = A\ i + 1$$
$$\gamma\ i = X\ 4i + 5 = B\ i + 1$$
$$\delta\ i = X\ 4i + 6 = A\ i + 1 - N$$

The sequence {α' i} derived by delaying {α i} by the N-bit delay term T at the delay device 1607, and the sequence {β' i} derived by delaying {β i} by the N-bit delay term T at the delay device 1608, can be expressed as follows:

$$\alpha'\ i = \alpha\ i-N = B\ i-2N$$
$$\beta'\ i = \beta\ i-N = A\ i+1-N$$

Thus, in state ④, though the input sequences {α' i} and {γ i} of the combiner 1609 are not equal sequences, the input sequences {β' i} and {δ i} of the combiner 1610 are equal sequences.

In sum, only in state ① do the input sequences of both combiners 1609 and 1610 become equal sequences. Therefore, the state is determined, and if it is other that ①, the conversion timing of the serial-parallel converter 1606 must be adjusted so that state ① is achieved and maintained. Said adjustment of the conversion timing is accomplished by the synchronization determining circuit 1605.

Figure 19:
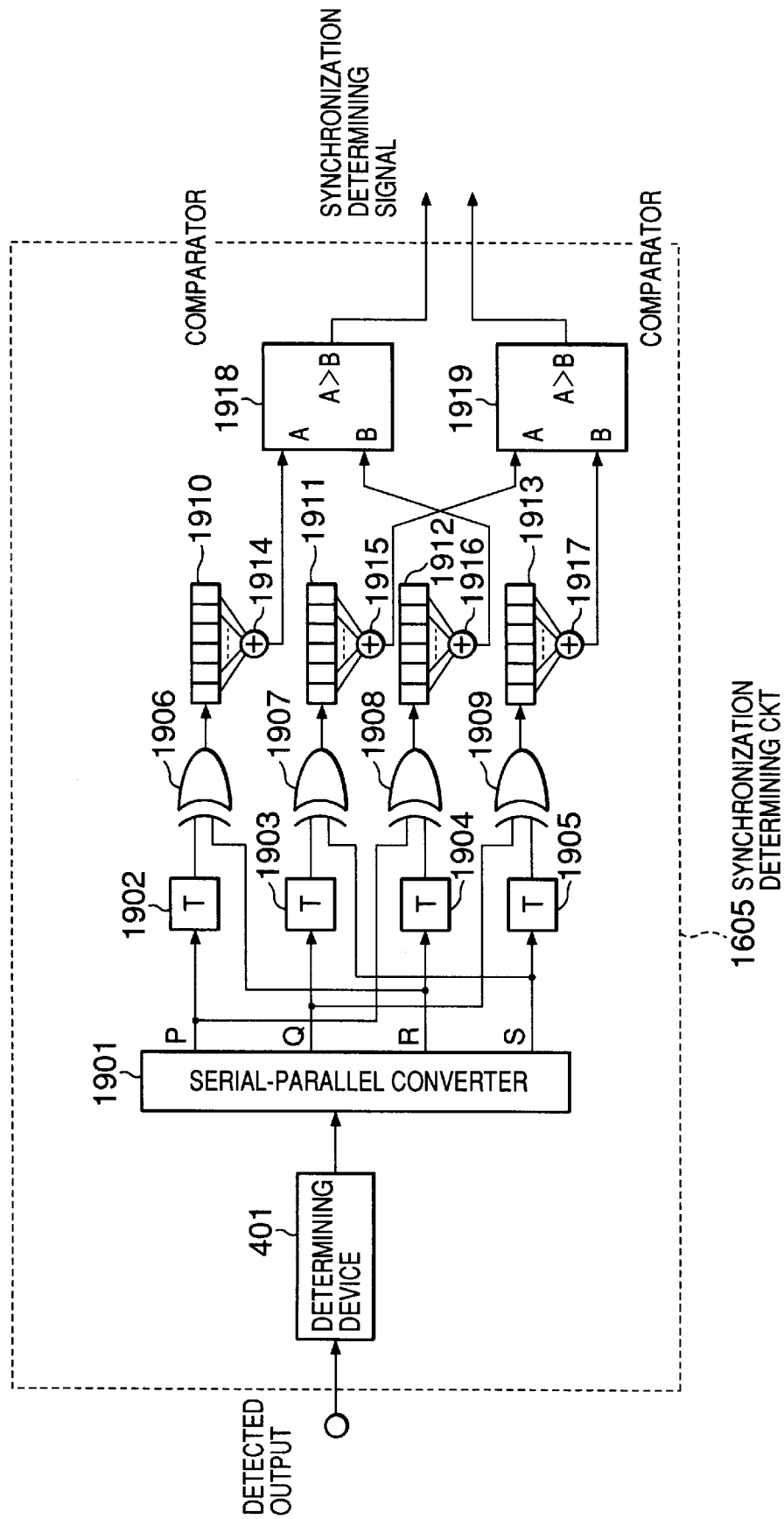
FIG. 19 is a structural diagram of a synchronization determining circuit constructed in accordance with the eighth embodiment.

FIG. 19 is a structural diagram of the synchronization determining circuit 1605. In FIG. 19, 1901 denotes a serial-parallel converter, 1902 and 1903 denote delay circuits each having a delay time equal to an N-bit delay term T, 1904 and 1905 denote delay circuits each having a delay time equal to an (N+1)-bit delay term T', 1906, 1907, 1908 and 1909 denote exclusive OR circuits, 1910, 1911, 1912 and 1913 denote shift registers, 1914, 1915, 1916 and 1917 denote adders, and 1918 and 1919 denote comparators. Elements of FIG. 19 which correspond to identical elements of FIG. 4 are assigned identical numbers, and re-explanation of those elements is omitted.

When output of the detecting circuit 106 is input to the synchronization determining circuit 1605, the determining circuit 401 generates hard-decision data (i.e., 1 or 0). Output of the determining circuit 401 is input to the serial-parallel converter 1901 to be converted and separated into four data sequences each having a data rate one-fourth that of the input data sequence. These four sequences are output on lines P, Q, R and S. It is assumed that the conversion timing of the serial-parallel converter 1901 is synchronized with that of the serial-parallel converter 1606. Also assume that the data sequences on lines P, Q, R and S are given by {P i}, {Q i}, {R i} and {Si}.

As shown in the figure, {P i} is input directly to the exclusive OR circuit 1908 and input indirectly to the exclusive OR circuit 1906 after being delayed by an amount equal to the N-bit delay term T at the delay device 1902. Also as shown in the figure, {Q i} is input directly to the exclusive OR circuit 1909 and input indirectly to the exclusive OR circuit 1907 after being delayed by an amount equal to the N-bit delay term T at the delay device 1903. Further, {R i} is input directly to the exclusive OR circuit 1906 and input indirectly to the exclusive OR circuit 1908 after being delayed by an amount equal to the (N+1)-bit delay term T' at the delay device 1904. Finally, {S i} is input directly to the exclusive OR circuit 1907 and input indirectly to the exclusive OR circuit 1909 after being delayed by an amount equal to the (N+1)-bit delay term T' at the delay device 1905.

Now, assuming that a data period is given by τ, T and T' can be expressed as follows:

$$T = N\tau$$

$$T' = T + \tau = (N+1)\tau$$

Also, assuming for simplification that no error due to noise is present, and assuming that the output data sequence of the determining device 401 is given by $\{x\ i\}$, then $\{x\ i\}$ is equal to the output $\{e\ i\}$ of the parallel-serial converter 1604 of the transmitting device. Thus, $\{x\ i\}$ can be expressed by the convolutionally encoded data sequences $\{a\ i\}$ and $\{b\ i\}$, and the delayed data sequences $\{a'\ i\}$ and $\{b'\ i\}$ derived by delaying $\{a\ i\}$ and $\{b\ i\}$ by an amount equal to the N-bit delay term T at the delay devices 1602, 1603 as follows:

$$x\ 4i = a\ i$$
$$x\ 4i + 1 = b\ i$$
$$x\ 4i + 2 = a'\ i = a\ i - N$$
$$x\ 4i + 3 = b'\ i = b\ i - N$$

The outputs $\{P\ i\}$, $\{Q\ i\}$, $\{R\ i\}$ and $\{Si\}$ derived by serial-parallel converting $\{x\ i\}$ can be expressed as follows:

$$P\ i = x\ 4i + m$$
$$Q\ i = x\ 4i + 1 + m$$
$$R\ i = x\ 4i + 2 + m$$
$$S\ i = x\ 4i + 3 + m \quad (m \text{ an integer})$$

Again, the relationships between $\{P\ i\}$, $\{Q\ i\}$, $\{R\ i\}$ and $\{Si\}$ depend upon the value of m. And again there are four possible cases, namely $m=4n+\mu$ (where n is an integer and $\mu=0, 1, 2,$ or 3). Note that the corresponding relationships between $\{P\ i\}$, $\{Q\ i\}$, $\{R\ i\}$ and $\{Si\}$ do not change as long as $\mu$ remains constant, even where n differs. Thus, $\{P\ i\}$, $\{Q\ i\}$, $\{R\ i\}$ and $\{Si\}$ will take one of four states (①, ②, ③, or ④), depending on the value of m. The value of m is determined by the data conversion timing of the serial-parallel converter 1901.

FIG. 20 depicts the input $\{xi\}$ and the outputs $\{P\ i\}$, $\{Q\ i\}$, $\{R\ i\}$ and $\{Si\}$ of the serial-parallel converter 1901. Table 2 shows the corresponding relationships between P i, Q i, R i, S i and a i, b i, a' i, b' i for the four respective states.

[TABLE 2]

|  | P i | Q i | R i | S i |
|---|---|---|---|---|
| State ① | a i | b i | a' i | b' i |
| State ② | b i | a' i | b' i | a i + 1 |
| State ③ | a' i | b' i | a i + 1 | b i + 1 |
| State ④ | b' i | a i + 1 | b i + 1 | a' i + 1 |

First assuming that m=0 (i.e., state ①), the sequences $\{P\ i\}$, $\{Q\ i\}$, $\{R\ i\}$ and $\{S\ i\}$ can be expressed from Table 2 as follows:

$$P\ i = x\ 4i = a\ i$$
$$Q\ i = x\ 4i + 1 = b\ i$$
$$R\ i = x\ 4i + 2 = a\ i - N$$
$$S\ i = x\ 4i + 3 = b\ i - N$$

Thus, if the sequences derived by delaying $\{P\ i\}$ and $\{Q\ i\}$ by an amount equal to the N-bit delay term T at the delay devices 1902 and 1903 are given by $\{P'\ i\}$ and $\{Q'\ i\}$, respectively, and if the sequences derived by delaying $\{R\ i\}$ and $\{S\ i\}$ by an amount equal to the (N+1)-bit delay term T' at the delay devices 1904 and 1905 are given by $\{R'\ i\}$ and $\{S'\ i\}$, respectively, then the inputs $\{P'\ i\}$ and $\{R\ i\}$ of the exclusive OR circuit 1906, the inputs $\{Q'\ i\}$ and $\{S\ i\}$ of 1907, the inputs $\{R'\ i\}$ and $\{P\ i\}$ of 1908, and the inputs $\{S'\ i\}$ and $\{Q\ i\}$ of 1909 can be expressed as follows:

$$P'\ i = a\ i - N$$
$$R\ i = a\ i - N$$
$$Q'\ i = b\ i - N$$
$$S\ i = b\ i - N$$
$$R'\ i = a\ i - 2N - 1$$
$$P\ i = a\ i$$
$$S'\ i = b\ i - 2N - 1$$
$$Q\ i = b\ i$$

Next assuming that m=1 (i.e., state ②), the sequences $\{P\ i\}$, $\{Q\ i\}$, $\{R\ i\}$ and $\{S\ i\}$ can be expressed from Table 2 as follows:

$$P\ i = x\ 4i + 1 = b\ i$$
$$Q\ i = x\ 4i + 2 = a\ i - N$$
$$R\ i = x\ 4i + 3 = b\ i - N$$
$$S\ i = x\ 4i + 4 = a\ i + 1$$

The inputs of the exclusive OR circuits 1906, 1907, 1908 and 1909 in state ② can be expressed as follows:

$$P'\ i = b\ i - N$$
$$R\ i = b\ i - N$$
$$Q'\ i = a\ i - 2N$$
$$S\ i = a\ i + 1$$
$$R'\ i = b\ i - 2N - 1$$
$$P\ i = b\ i$$
$$S'\ i = a\ i - N$$
$$Q\ i = a\ i - N$$

Next assuming that m=2 (i.e., state ③), the sequences $\{P\ i\}$, $\{Q\ i\}$, $\{R\ i\}$ and $\{S\ i\}$ can be expressed from Table 2 as follows:

$$P\ i = x\ 4i + 2 = a\ i - N$$
$$Q\ i = x\ 4i + 3 = b\ i - N$$
$$R\ i = x\ 4i + 4 = a\ i + 1$$
$$S\ i = x\ 4i + 5 = b\ i + 1$$

The inputs of the exclusive OR circuits 1906, 1907, 1908 and 1909 in state ③ can be expressed as follows:

$$P'\ i = a\ i - 2N$$
$$R\ i = a\ i + 1$$
$$Q'\ i = b\ i - 2N$$
$$S\ i = b\ i + 1$$
$$R'\ i = a\ i - N$$
$$P\ i = a\ i - N$$
$$S'\ i = b\ i - N$$
$$Q\ i = b\ i - N$$

Next assuming that m=3 (i.e., state ④), the sequences $\{P\ i\}$, $\{Q\ i\}$, $\{R\ i\}$ and $\{S\ i\}$ can be expressed from Table 2 as follows:

$$P\ i = x\ 4i + 3 = b\ i - N$$
$$Q\ i = x\ 4i + 4 = a\ i + 1$$
$$R\ i = x\ 4i + 5 = b\ i + 1$$
$$S\ i = x\ 4i + 6 = a\ i + 1 - N$$

The inputs of the exclusive OR circuits 1906, 1907, 1908 and 1909 in state ④ can be expressed as follows:

$$P'\ i = b\ i - 2N$$
$$R\ i = b\ i + 1$$
$$Q'\ i = a\ i + 1 - N$$
$$S\ i = a\ i + 1 - N$$
$$R'\ i = b\ i - N$$
$$P\ i = b\ i - N$$
$$S'\ i = a\ i - 2N$$
$$Q\ i = a\ i + 1$$

As described above with respect to states ①–④, the inputs of two of the exclusive OR circuits 1906, 1907, 1908 and 1909 always become equal sequences. Thus, the outputs of those exclusive OR circuits will always be 0. On the other hand, because the inputs of the remaining two exclusive OR circuits do not become equal sequences, the remaining two exclusive OR circuits output 0 when the input data are equal, and 1 when they are not equal. More specifically, the two remaining exclusive OR circuits output 0 and 1 at random. Table 3 indicates whether the outputs of the exclusive OR circuits 1906, 1907, 1908 and 1909 are 0 or random for states ①–④.

[TABLE 3]

|  | exclusive OR 1906 output | exclusive OR 1907 output | exclusive OR 1908 output | exclusive OR 1909 output |
|---|---|---|---|---|
| State ① | 0 | 0 | random | random |
| State ② | 0 | random | random | 0 |
| State ③ | random | random | 0 | 0 |
| State ④ | random | 0 | 0 | random |

The outputs of the exclusive OR circuits 1906, 1907, 1908 and 1909 are input to the M-stage shift registers 1910, 1911, 1912 and 1913, respectively, and taps from the shift register stages are output to the adders 1914, 1915, 1916 and 1917, as shown. The moving-sum outputs S1Ai, S2Ai, S1Bi and S2Bi of the adders 1914, 1915, 1916 and 1917 can be expressed as follows:

$$S^{1A}i = \sum_{j=i-N+1}^{i} Pj' \oplus Rj$$

$$S^{2A}i = \sum_{j=i-N+1}^{i} Qj' \oplus Sj$$

$$S^{1B}i = \sum_{j=i-N+1}^{i} Rj' \oplus Pj$$

$$S^{2B}i = \sum_{j=i-N+1}^{i} Sj' \oplus Qj$$

(wherein, $\oplus$ represents the *EXOR* operation)

Figure 21A:
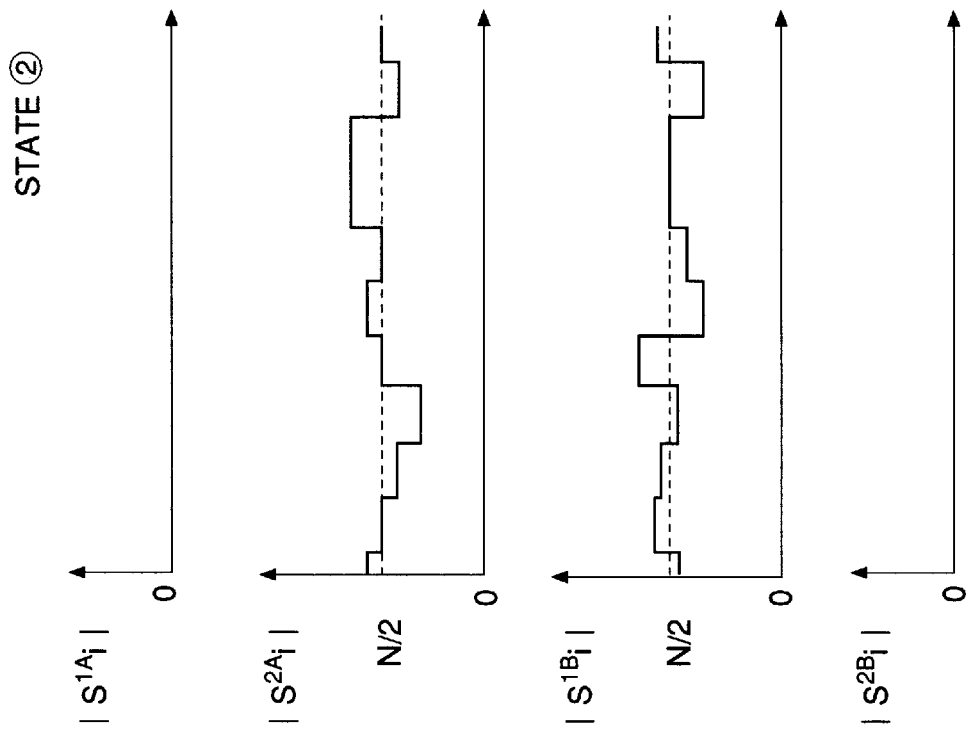
FIGS. 21(a) and 21(b) are diagrams showing adder outputs within the synchronization determining circuit of FIG. 19.
Figure 21B:
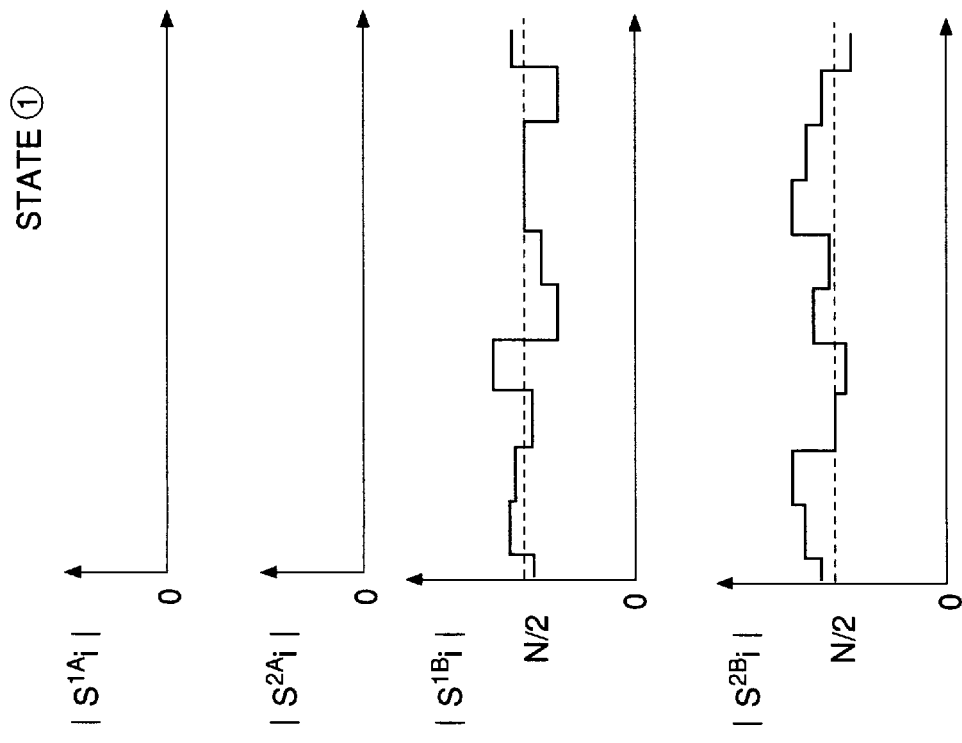

If the output of the exclusive OR circuit is 0, then the adder output is also 0. However, if the output of the exclusive OR circuit is random, then the adder outputs random values having a mean value corresponding to half the number of stages M of the shift register. FIG. 21(*a*) depicts time-domain variations of the respective adder outputs in state ①, while FIG. 21(*b*) depicts those time-domain variations in state ②. Additionally, FIG. 22(*a*) depicts time-domain variations of the respective adder outputs in state ③, while FIG. 22(*b*) depicts those time-domain variations in state ④.

Figure 22A:
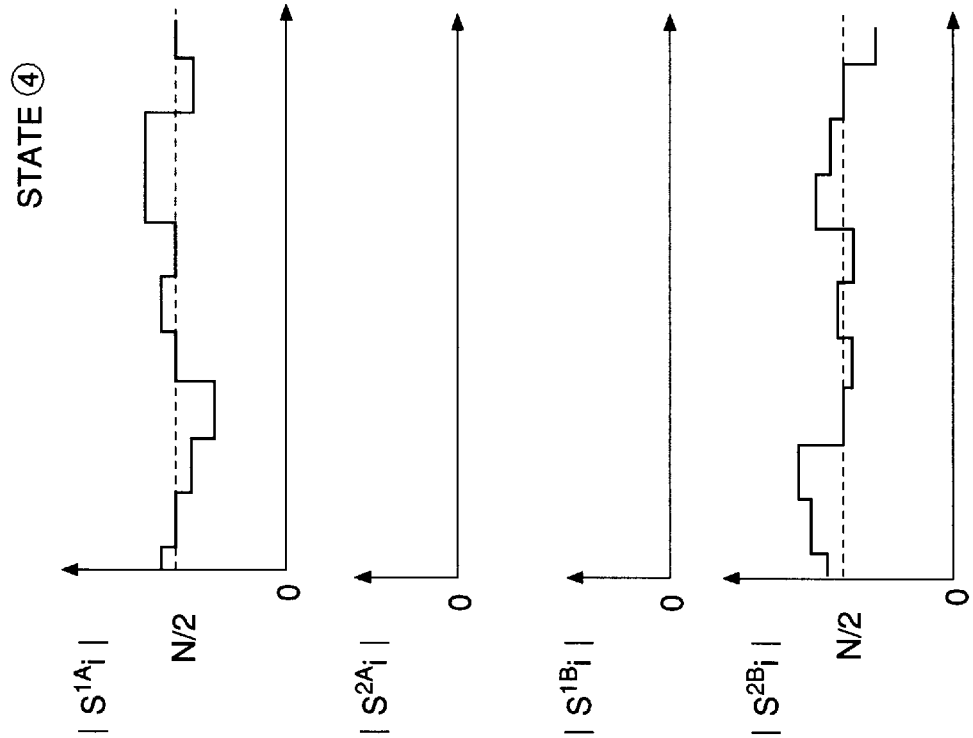
FIGS. 22(a) and 22(b) are diagrams showing adder outputs within the synchronization determining circuit of FIG. 19.
Figure 22B:
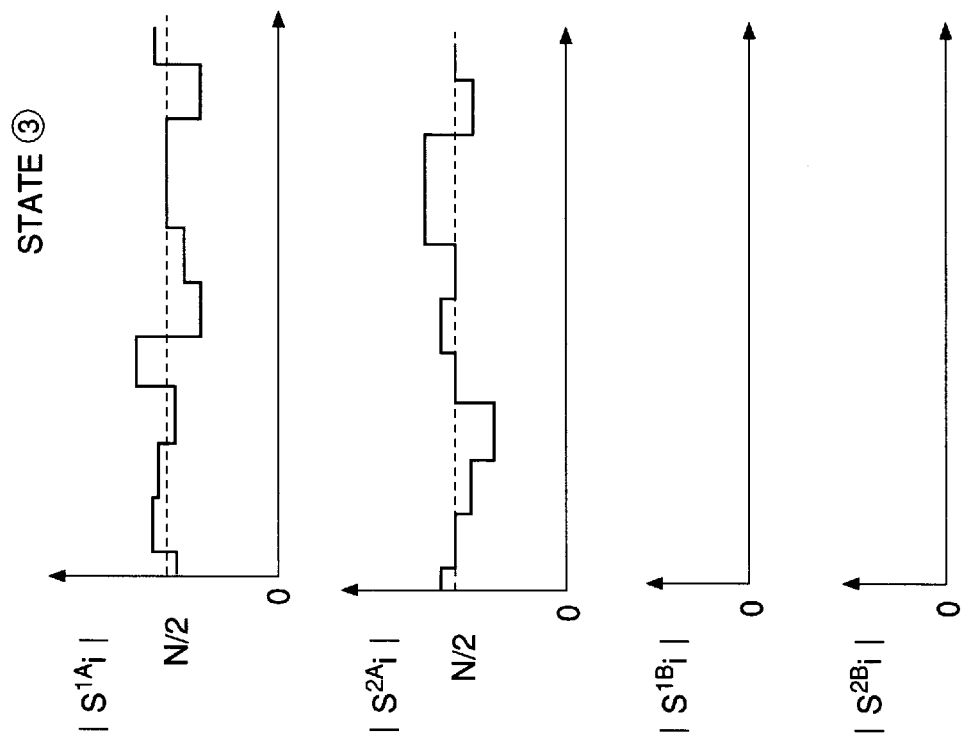

As shown in FIGS. 21 and 22, the adders 1914 and 1915 output 0 in state ①, the adders 1914 and 1917 output 0 in state ②, the adders 1916 and 1917 output 0 in state ③, and the adders 1915 and 1916 output 0 in state ④. In each instance, the remaining adders produce random output having a mean value corresponding to half of M. Thus, by comparing the magnitudes of the adders 1914, 1915, 1916 and 1917, the state ((①, ②, ③, or ①), can be determined.

Output of the adder 1914 is input to an input A of the comparator 1918, and output of the adder 1915 is input to an input A of the comparator 1919. Output of the adder 1916 is input to an input B of the comparator 1918, and output of the adder 1917 is input to an input B of the comparator 1919. The output C1o of the comparator 1918 and the output C2o of the comparator 1919, which are the synchronization determining signals, take on the following values depending on which state ①–④ is in effect:

$$C^1 0 = \begin{cases} 0 \\ 0 \\ 1 \\ 1 \end{cases} \quad C^2 0 = \begin{cases} 0 & \text{state 1} \\ 1 & \text{state 2} \\ 1 & \text{state 3} \\ 0 & \text{state 4} \end{cases}$$

Thus, the synchronization determining signals C1o and C2o indicate which state the serial-parallel converter 1606 is in. As described previously, because the conversion timings of the serial-parallel converters 1606 and 1901 are assumed to be the same, the state of the serial-parallel converter 1901 and the state of the serialparallel converter 1606 coincide with each other. Thus, the conversion timing of the serial-parallel converter 1606 is also indicated by the synchronization determining signals C1o and C2o.

The synchronization determining signals C1o and C2o are input to an outputselecting input of the serial-parallel converter 1606. The serial-parallel converter 1606 continues to output as it is when C1o=C2o=0, thus maintaining state ①. Otherwise, it adjusts the serial-parallel conversion timing so that state ① is achieved and maintained. Thus, proper data synthesis and decoding can be performed.

Even if the conversion Output of the serial-parallel converter 1606 is initially incorrect, because the synchronization determining circuit 1605 detects the synchronization state and controls the serial-parallel converter 1606 using the synchronization determining signal, the correct serial-parallel conversion output will be achieved.

As just described, the conversion timing of the serial-parallel converter 1606 is always in state ① Thus, when the outputs {α i} and {β i} are delayed by an amount equal to the N-bit delay term T at the delay devices 1607 and 1608, the resulting sequences {α' i} and {β' i} are equal to {γ i} and {δ i}. As a result, {α' i} and {γ i}, and {β' i} and {δ i} are properly combined at the combiners 1609 and 1610, respectively. Outputs of the combiners 1609 and 1610 are input to the Viterbi decoder 1611 where optimum decoding is performed. Output of the Viterbi decoder 1611 (i.e., the demodulated data) is then decoded by a sound decoder or the like to obtain the desired sound or video data.

By performing convolutional coding at the transmitting device and Viterbi decoding at the receiving device, an advantage is gained over the prior art in that the system error rate for a given signal-to-noise ratio Eb/N0 is reduced. Further, since code synchronization can be achieved independent of the operation of the Viterbi decoder, there is no need for a maximum pass metric state detecting circuit, and the overall structure of the Viterbi decoder can be simplified.

Figure 23:
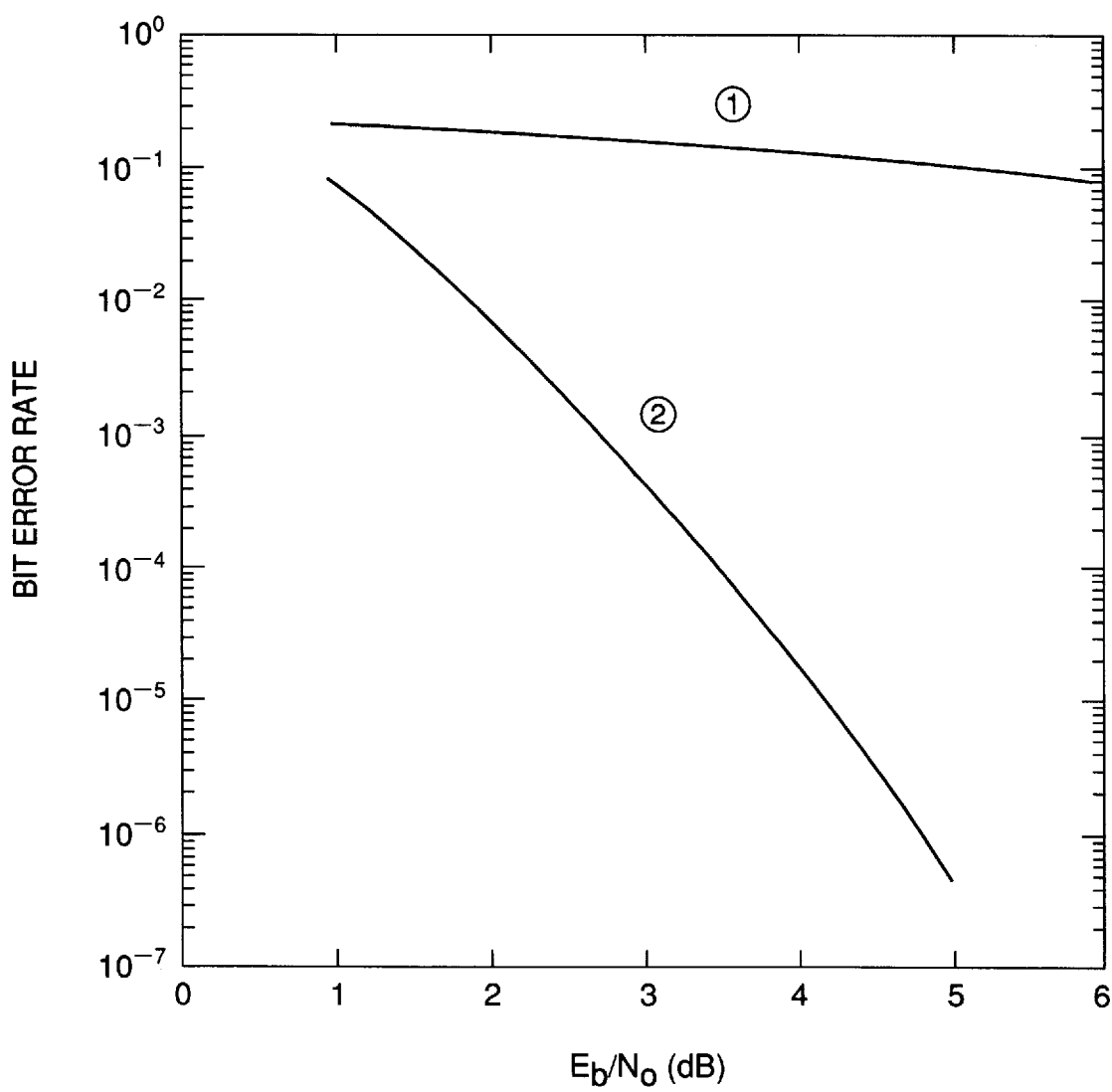
FIG. 23 is a diagram showing bit error rates associated with the eighth embodiment.

FIG. 23 shows system bit error rates with and without convolutional coding. In FIG. 23, the abscissa represents the signal-to-noise ratio Eb/N0, and the ordinate represents the bit error rate. A curved line ① in the figure represents the theoretical bit error rate Pe=½ erfc(Eb/N0)½ when using a BPSK modulating scheme. A second curved line ② represents an empirical result, obtained by means of a calculator, of the upper bound on the bit error rate when a convolutional code of constraint length K=7 is used with the BPSK modulating mode. As shown, the convolutional coding scheme provides a vastly improved bit error rate.

Ninth Embodiment

In the eighth embodiment, output of the detecting circuit is input directly to the serial-parallel converter. FIG. 24 depicts an embodiment in which a delay device 2401, corresponding to the overall process delay DL associated with the synchronization determining circuit, is inserted subsequent to the detecting circuit 106. This delay device 2401 functions as compensating means for compensating for the process delay of the synchronization determining circuit 1605. As shown, the delay device 2401 outputs the multiplexed data stream, after compensation, to the serial-parallel converter 1606 which serves as a separating means. By employing such a feedforward-type arrangement, Viterbi decoding can be performed after synchronization is established. As a result, an advantage over the prior art is gained in that there is no possibility that an incorrectly decoded sequence will be output for a period of time before synchronization is established.

Tenth Embodiment

Figure 25B:
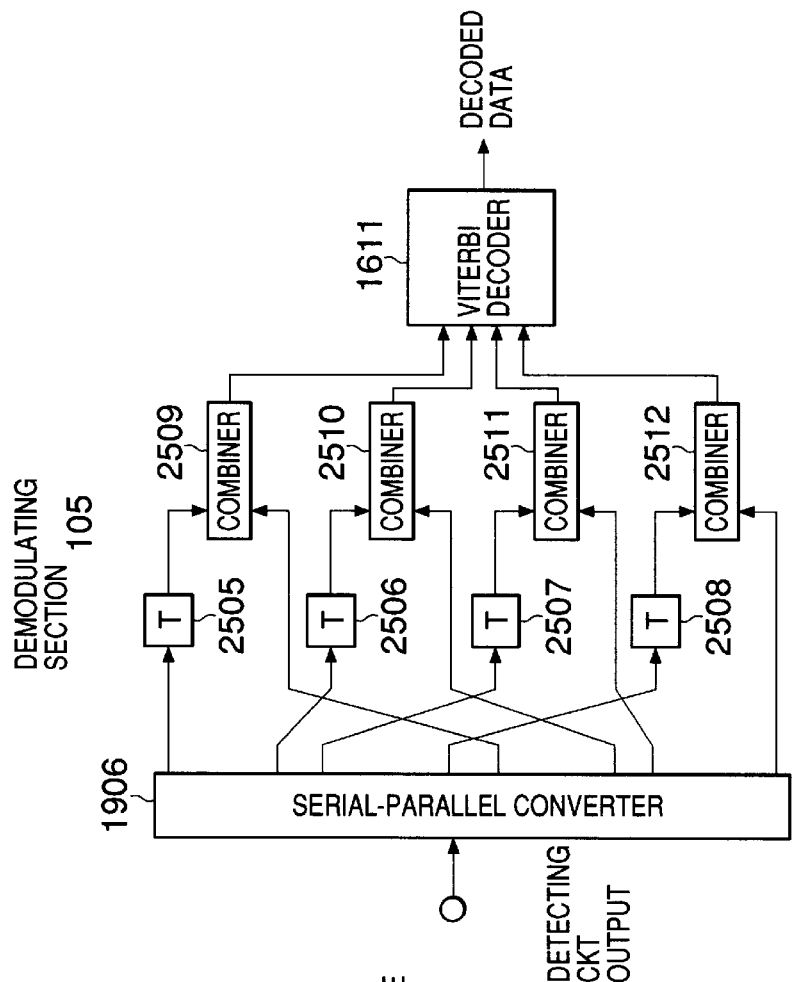
FIGS. 25(a) and 25(b) are structural diagrams of a modulating section and a demodulating section constructed in accordance with a tenth embodiment of the present invention.
Figure 25A:
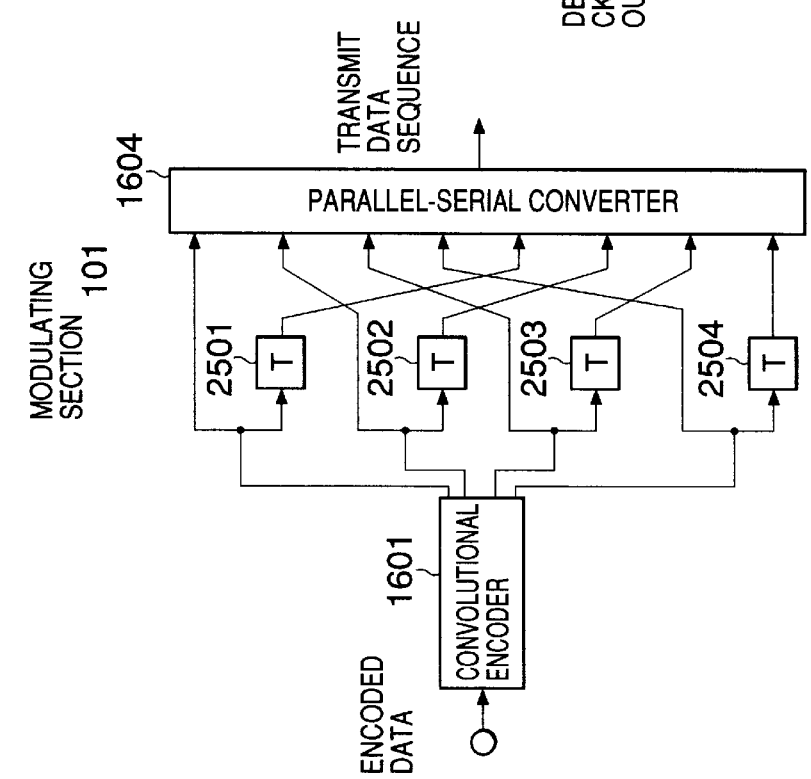

In the eighth embodiment, the coding rate R of the convolutional encoder is set to ½. This need not be the case. For example, the coding rate R may be set to ⅘ simply by puncturing the code. Alternatively, it may be set to ¼ as shown in FIG. 25. In FIG. 25, the parallel-serial converter 1604 receives 8 inputs, and the data rate of the single output is 8 times that of those inputs. However, the data rate of the output of the serial-parallel converter 1606 is ⅛ that of its input data sequence.

Eleventh Embodiment

Figure 26A:
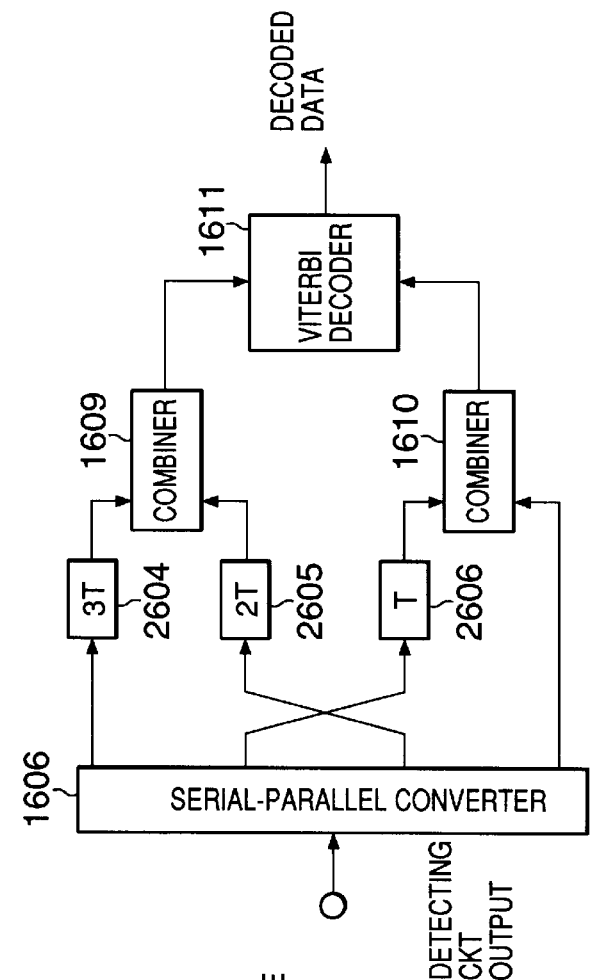
FIGS. 26(a) and 26(b) are structural diagrams of a modulating section and a demodulating section constructed in accordance with an eleventh embodiment of the present invention.
Figure 26B:
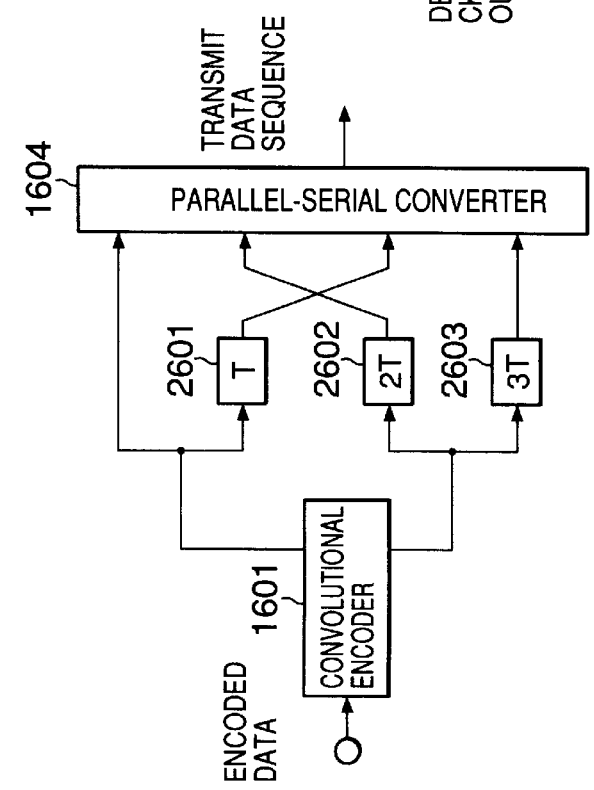

In the eighth embodiment, all the delays provided at the transmitting device and the receiving device are set to T. However, this need not be the case. For example, as shown in FIG. 26, delays of 0, 2T, T and 3T may be provided to four data sequences at the modulating section. In that case, delays provided at the demodulating section would be set to 3T, T, 2T and 0, respectively, in order to equalize the delays. Note that in FIG. 26, the relative delay provided between data sequences to be combined is identical to that provided in the eighth embodiment (i.e., T). Therefore, the synchronization determining circuit used with the embodiment of FIG. 26 may be constricted as was described with respect to the eighth embodiment.

Twelfth Embodiment

In the eighth embodiment, the delays provided at the transmitting device and the receiving device are set to T. However, this need not be the case. FIG. 27 depicts an alternative configuration. The figure shows delays given to four data sequences, and also shows a corresponding order of parallel-serial conversion.

In the figure, 2601 and 2606 denote delay devices each having a delay of 2T, 2602 and 2605 denote delay devices each having a delay of T, and 2603 and 2604 denote delay devices each having a delay of 3T. One of two outputs of the convolutional encoder 1601 is input to both the parallel-serial converter 1604 and the delay device 2601. The other output of the convolutional encoder 1601 is input to both the delay device 2602 and the delay device 2603.

Because the delay between data sequences to be combined is 2T, as opposed to T, degradation in the received signal levels due to fading or blockage is reduced. In other words, because the transmitted copies of a given data block are separated further in time, it is less likely that a given signal drop-out or blockage will destroy both copies of that data. Note that, because the delay between combined data sequences is 2T, the delay times within the synchronization determining circuit must be adjusted accordingly. Specifically, the delay time of the delay device having a delay time of T in the eighth embodiment must be set to 2T for the present embodiment. Also, the delay time of the delay device having a delay time of T'=T+τ in the eighth embodiment must be set to 2T+τ for the present embodiment.

Thirteenth Embodiment

Figure 28A:
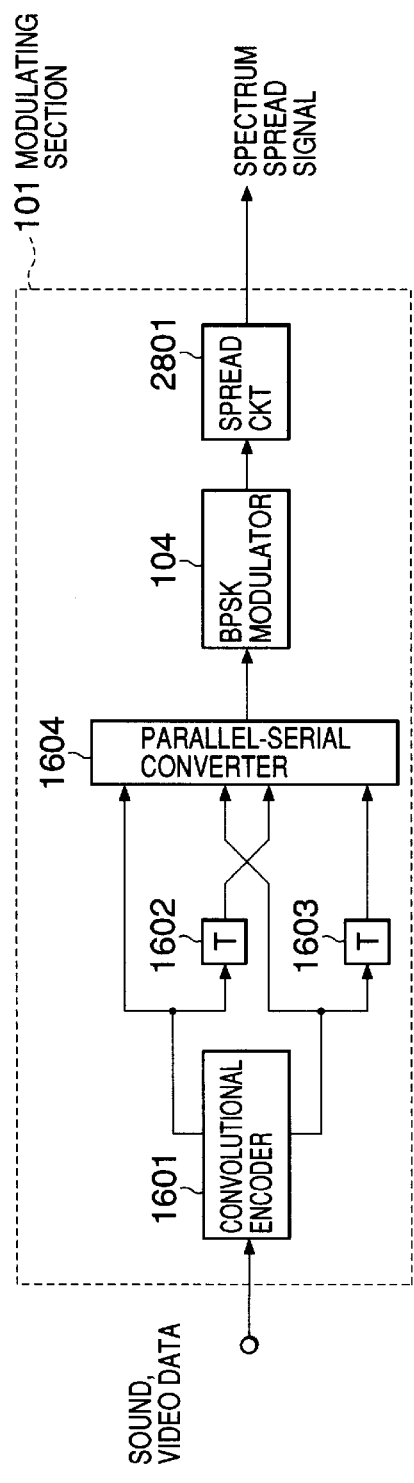
FIGS. 28(a) and 28(b) are structural diagrams of a communication system constructed in accordance with a thirteenth embodiment of the present invention.
Figure 28B:
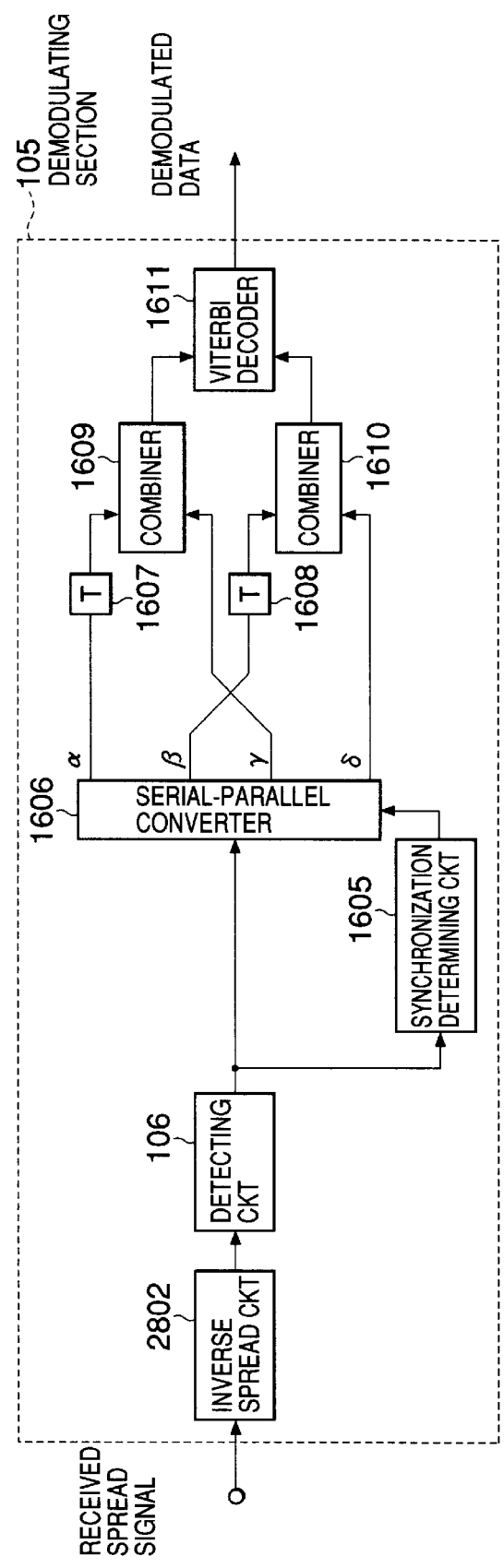

FIG. 28 is a structural diagram of a communication system constructed in accordance with a thirteenth embodiment of the present invention. In FIG. 28, 2801 denotes a spectrum spreading circuit, and 2802 denotes a spectrum despreading circuit. Elements of FIG. 28 which correspond to identical elements of FIG. 16 are assigned identical numbers, and re-explanation of those elements is omitted.

As in the eighth embodiment, sound or video data are converted into a digital signal by a sound encoder or the like in order to form a data sequence for transmission. The data sequence to be transmitted is input to the modulating section 101 and convolutionally encoded at the convolutional encoder 1601 with a coding rate R=½. Two output data sequences from the convolutional encoder 1601 are input directly to the parallel-serial converter 1604. At the same time, the same two output sequences are input indirectly to the parallel-serial converter 1604 after being delayed by an amount equal to the N-bit delay term T at the delay devices 1602 and 1603. The parallel-serial converter 1604 converts the four parallel input data sequences into a serial data sequence having a data rate four times that of the input data sequence. The output of the parallel-serial converter 1604 is BPSK-modulated at the BPSK modulator 104 and then input to the spectrum spreading circuit 2801 where the spectrum spreading function is performed.

Figure 29:
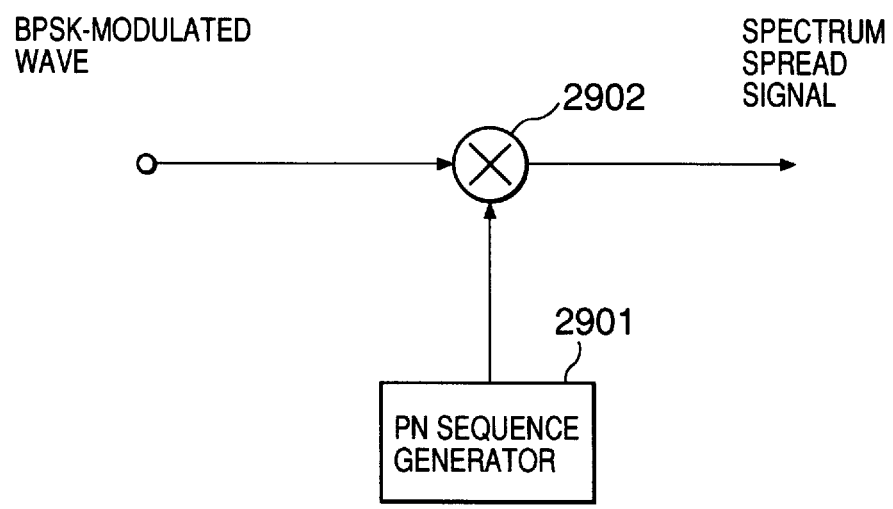
FIG. 29 is a structural diagram of a spreading circuit constructed in accordance with a fourteenth embodiment of the present invention.

FIG. 29 is a structural diagram of the spectrum spreading circuit 2801. In FIG. 29, 2901 denotes a PN sequence generator and 2902 denotes a multiplier. The modulated signal input to the spectrum spreading circuit 2801 is input to the multiplier 2902. At the multiplier 2902, the serial data sequence is multiplied by a PN sequence output from the PN sequence generator 2901. The PN sequence has a rate higher than that of the modulated data rate so that a spectrum-spread signal is output.

Figure 30:
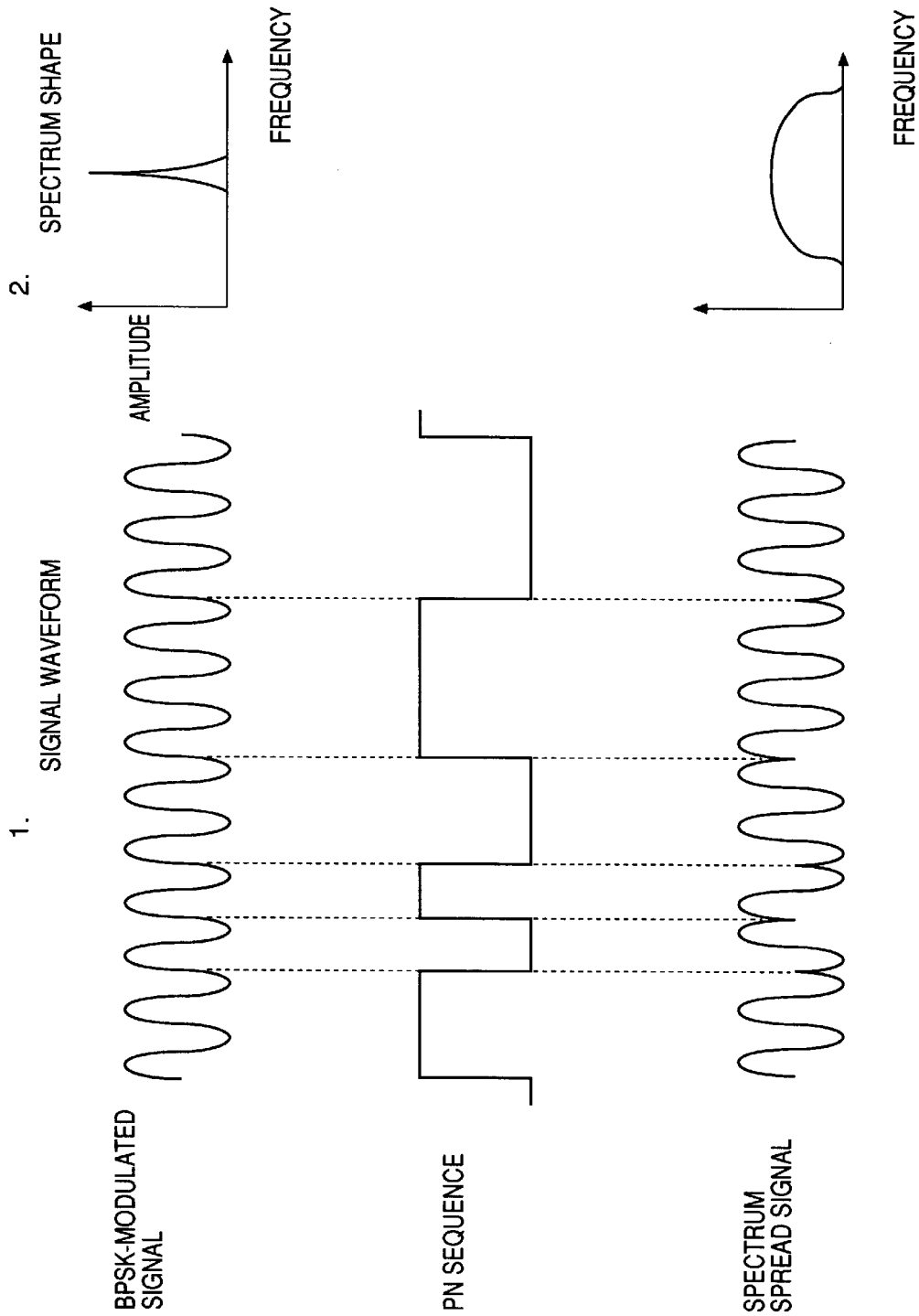
FIGS. 30(a), 30(b) and 30(c) are diagrams depicting operation of the spreading circuit of FIG. 29.

FIG. 30 depicts a signal waveform and a spectrum shape associated with (a) a BPSK-modulated signal, (b) a PN sequence and (c) a spectrum-spread signal. In FIG. 30, the BPSK-modulated signal shown at (a), having a narrow-band spectrum, is multiplied by the PN sequence shown at (b), having a higher rate than the modulated data rate. Thus, the spectrum-spread signal shown at (c) is generated. As shown in FIG. 30, the spectrum-spread signal is a broad-band signal as compared with the BPSK-modulated signal.

The spectrum spread signal output from the spectrum spreading circuit 2801 is transmitted after being power-amplified by a radio-frequency amplifier or the like. The transmitted electric wave is received by the receiving device by means of a transmission channel, and then input to the demodulating section 105 after being power-amplified by a radio-frequency amplifier or the like. The received signal is then input to the spectrum despreading circuit 2802 where the inverse of the spectrum spreading function is performed.

Figure 31:
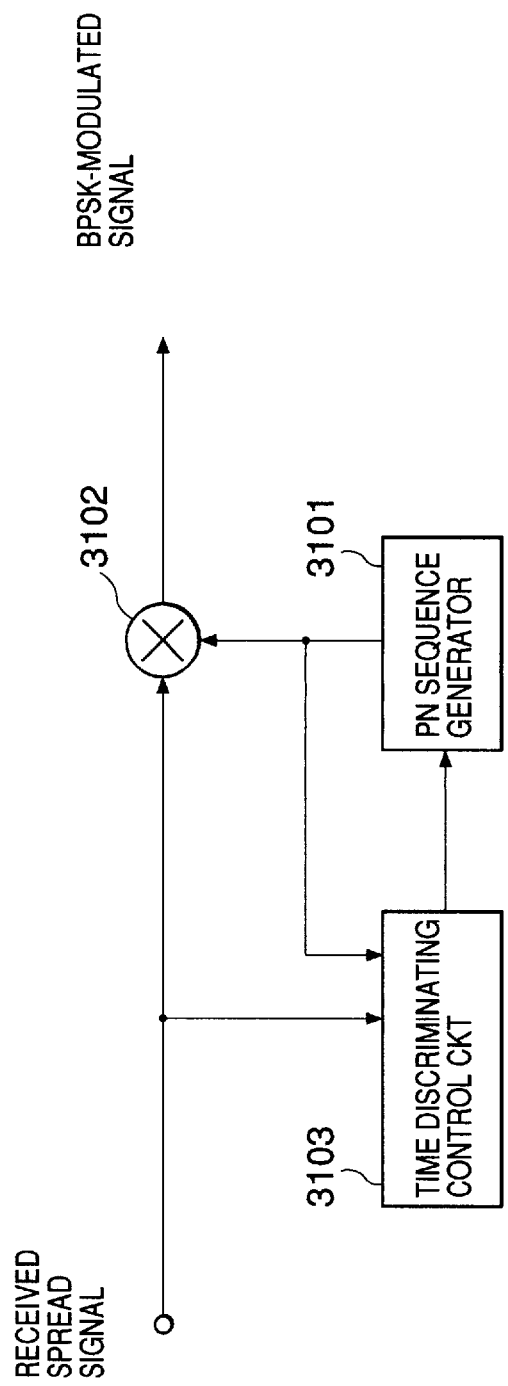
FIG. 31 is a structural diagram of an inverse spreading circuit constructed in accordance with the fourteenth embodiment.

FIG. 31 is a structural diagram of the spectrum despreading circuit 2802. In FIG. 31, 3101 denotes a PN sequence generator, 3102 denotes a multiplier, and 3103 denotes a time discriminating control circuit. The received spectrum-spread signal input to the spectrum despreading circuit 2802 is input to the time discriminating circuit 3101 so as to control the PN sequence generator 3101 such that a PN sequence output from the PN sequence generator 3101 is synchronized with the PN sequence of the transmitting device. The received spectrum-spread signal is also input to the multiplier 3102 so that it is multiplied by the PN sequence which is output from the PN sequence generator 3101. Thus, the BPSK-modulated signal is output from the multiplier 3102.

Figure 32:
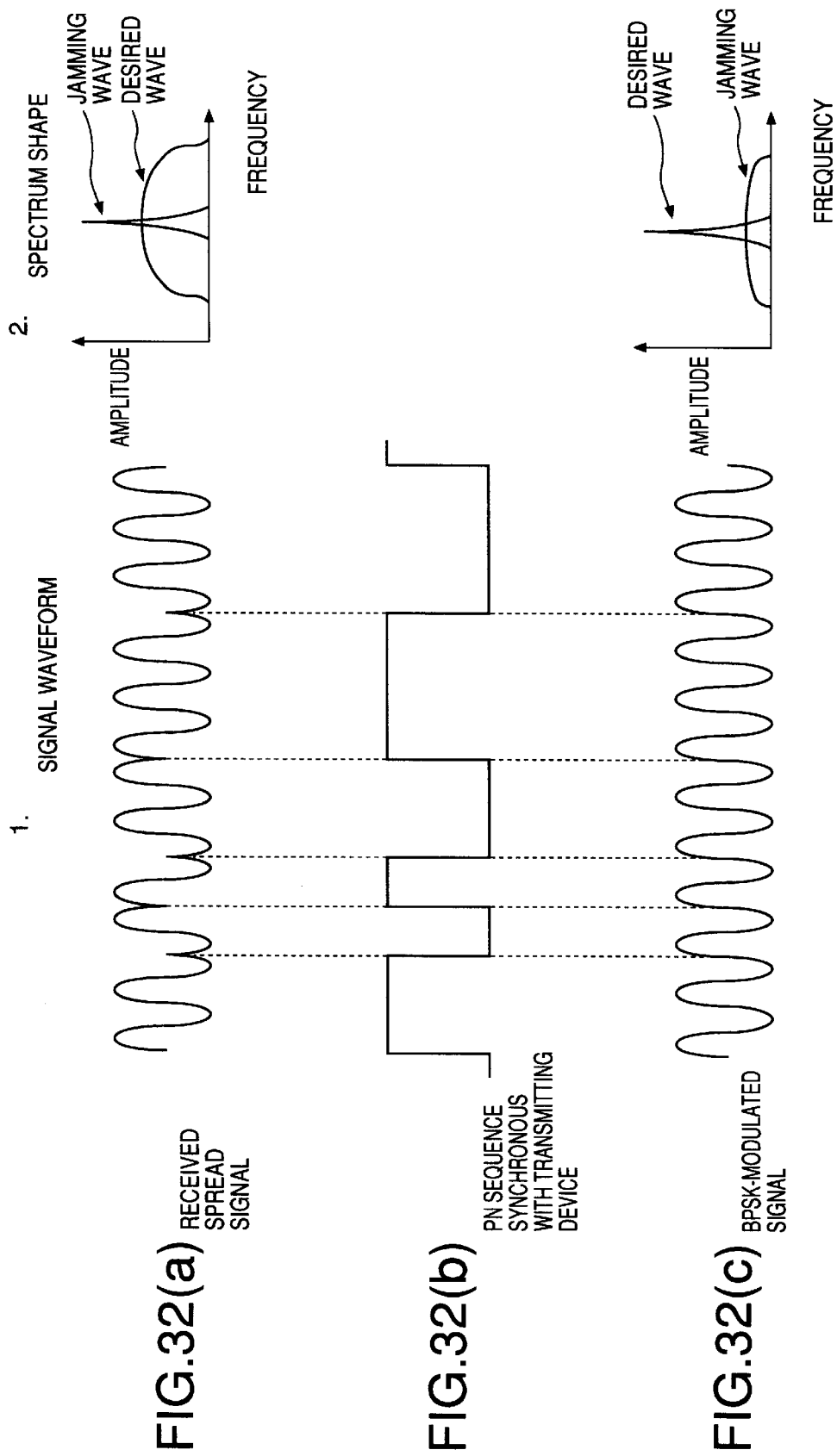
FIGS. 32(a), 32(b) and 32(c) are diagrams depicting operation of the inverse spreading circuit of FIG. 31.
Figure 33:
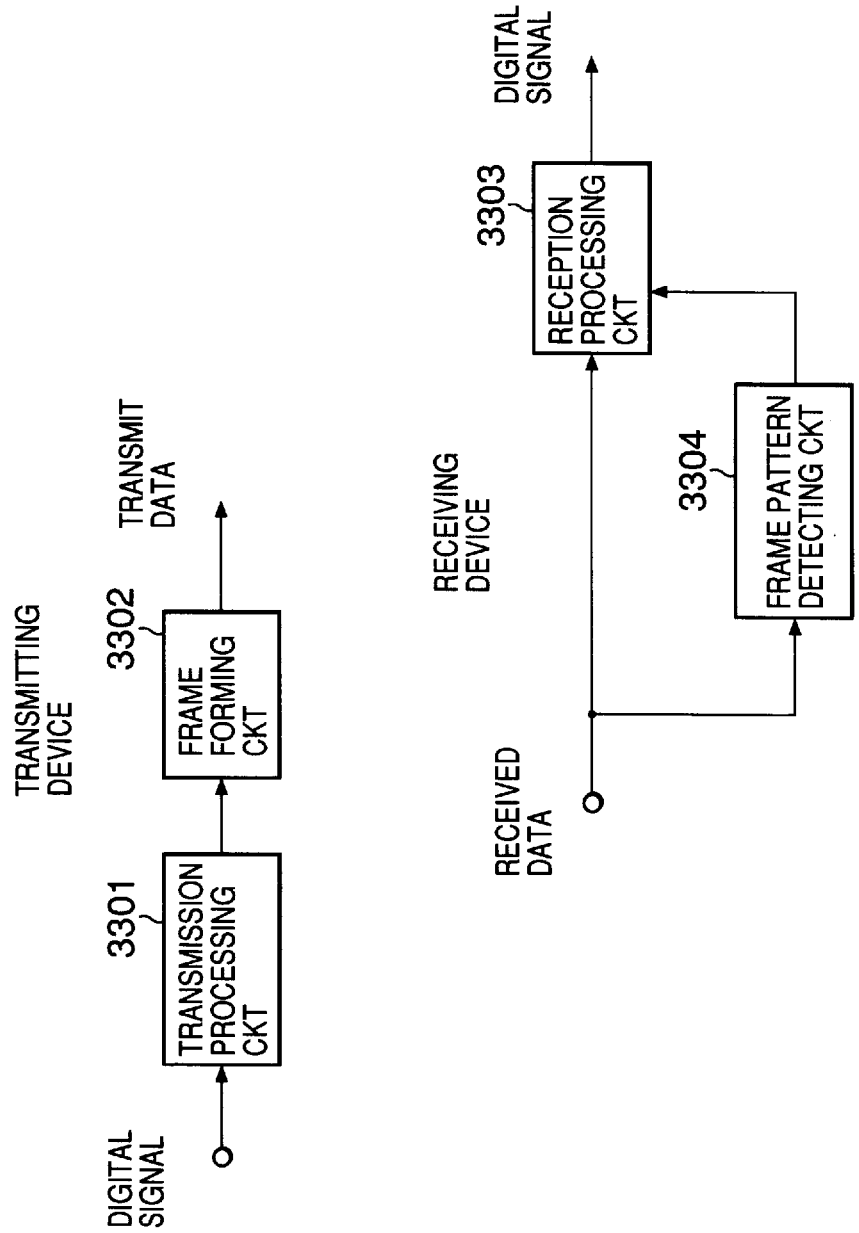
FIG. 33 is a structural diagram of a conventional communication system.
Figure 34:
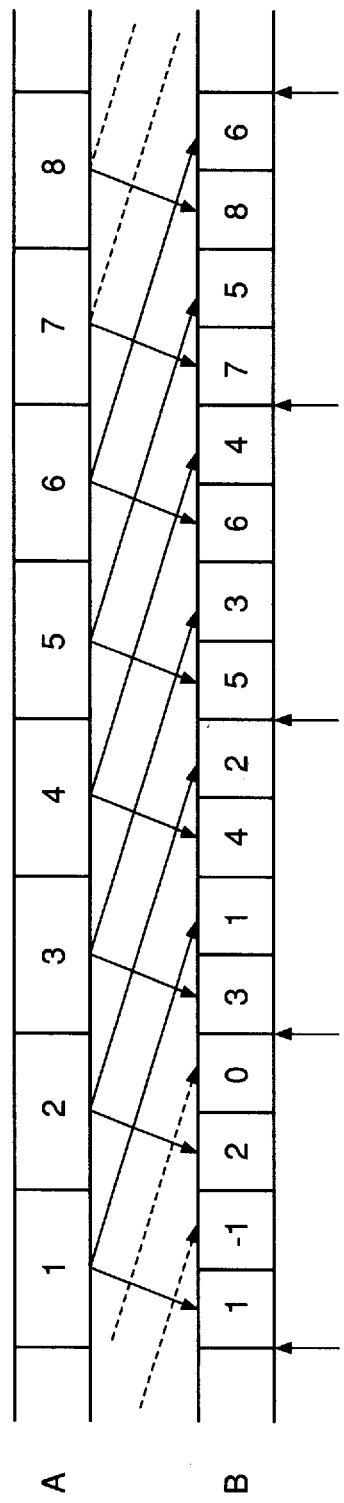
FIGS. 34(a) and 34(b) are diagrams depicting operation of a conventional transmission processing circuit.
Figure 35:
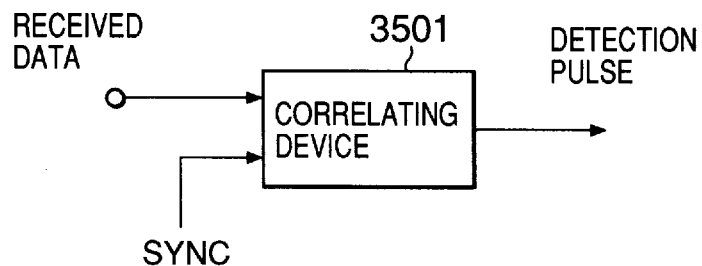
FIG. 35 is a structural diagram of a conventional frame pattern detecting circuit.
Figure 37:
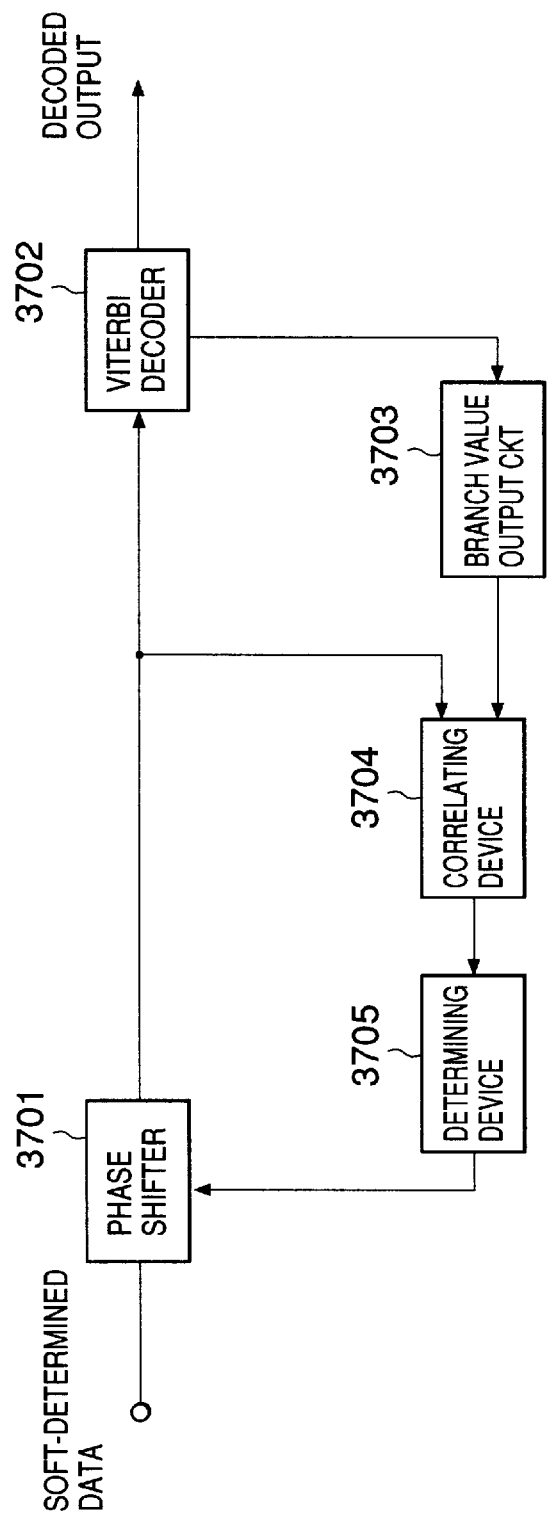
FIG. 37 is a structural diagram of a conventional Viterbi-decoding receiving device.

FIG. 32 depicts a signal waveform and a spectrum shape of (a) a received signal, (b) a PN sequence synchronous with that of the transmitting device and (c) a BPSK-modulated signal. In FIG. 32, it is assumed that the received signal shown at (a) contains a narrow-band jamming wave (received from an interfering transmitting station) in addition to the broad-band spectrum-spread signal which is to be demodulated. By multiplying the received signal by the PN sequence shown at (b), the inverse of the spectrum spreading function is performed, and the BPSK-modulated signal shown at (c) (having the original narrow-band spectrum) is obtained. Note that the narrow-band jamming wave from the second (interfering) station is spectrum spread and converted into a low-level signal as shown at (c). By employing a spread spectrum system wherein the spectrum spreading function is performed at the transmitter side, and the spectrum despreading function is performed at the receiver side, disturbances from other stations are reduced.

The BPSK-modulated signal output from the spectrum despreading circuit 2802 is detected at the detecting circuit 106. The output of the detecting circuit is input to the serial-parallel converter 1606 and to the synchronization determining circuit 1605 where synchronization determination is performed. The output of the serial-parallel converter 1606 is converted into four data sequences $\{\alpha\, i\}$, $\{\beta\, i\}$, $\{\gamma\, i\}$ and $\{\delta\, i\}$. Because $\{\gamma\, i\}$ and $\{\delta\, i\}$ are delayed relative to $\{\alpha\, i\}$ and $\{\beta\, i\}$ by T at the time of transmission, those delays must be equalized at reception by delaying $\{\alpha\, i\}$ and $\{\beta\, i\}$ by T at the delay devices 1607 and 1608, as shown.

If the outputs of the delay devices 1607 and 1608 are given by $\{\alpha'\, i\}$ and $\{\beta'\, i\}$, the combiners 1609 and 1610 combine $\{\alpha'\, i\}$ and $\{\delta\, i\}$, and $\{\beta'\, i\}$ and $\{\delta\, i\}$, respectively. The outputs of the combiners 1609 and 1610 are input to the Viterbi decoder 1611 where maximum likelihood decoding is performed. Output of the Viterbi decoder 1611 (i.e., the demodulated data), is decoded by a sound decoder or the like and output as the desired sound or video data.

By employing a spread spectrum communication system wherein the spreading and spectrum despreading functions are performed at the time of transmission and reception, respectively, the communication system is resilient to interference, and provides for secure (secret) data transmission.

Fourteenth Embodiment

In the thirteenth embodiment, spectrum spreading is performed after BPSK modulation is performed at the transmitting device, and synchronization detection is performed after the spectrum despreading function is performed at the receiving device. In an alternative configuration, the BPSK modulation is performed after the spectrum spreading is performed, and the spectrum despreading function is performed after synchronization detection is performed.

In each of the foregoing embodiments, discussion has focused on radio communication. However, the present invention is not limited thereto, and is readily applicable to wire-line communication.

As is evident from the foregoing description, a synchronization determining circuit according to a first embodiment of the invention is provided with separating means for separating particularly the inputted multiplex data stream to output a plurality of data streams; delaying means for delaying at least one of the plurality of data streams outputted from the separating means by a time corresponding to the time lag; comparing means for comparing the data stream delayed by the delaying means and a data stream outputted from the separating means which is not delayed by the delaying means so as to output comparison data; and synchronization determining means for determining a synchronization state of the multiplex data stream based on the comparison data. Accordingly, since synchronization is established without using a synchronization word, transmission efficiency is improved. Further, since there is no feedback, no loop delay exists, and an incorrectly decoded sequence is not output for a period of time before synchronization is established. Further, since it is not necessary to provide a maximum pass metric state detecting circuit, circuit scale and consumptive power can be decreased, and the operating speed can be improved relative to the prior art.

According to a second aspect of the invention, the synchronization determining circuit of the first embodiment includes adding means for adding a given quantity of the comparison data and outputting an adding result and determines the synchronization state of the multiplex data stream based on the adding result. Accordingly, in addition to the effect of the first aspect of the invention, the accuracy of synchronization determination can be enhanced.

A synchronization determining circuit according to a third aspect of the invention is provided, in which the adding means of the second embodiment includes storing means for storing a given quantity of the comparison data and adds in sequence by adding the comparison data newly inputted and subtracting the comparison data newly deleted, relative to an added value of the comparison data stored in the storing means. Accordingly, in addition to the effect of the second aspect of the invention, since the number of elements to be added can be reduced, the synchronization can be determined with a simple structure.

There is provided a synchronization determining circuit according to a fourth aspect of the invention, wherein the adding means of the second embodiment includes storing means for storing a given quantity of the comparison data and counting means for indicating an added value and compares a value of the comparison data newly inputted to the storing means and a value of the comparison data newly deleted by the storing means so as to add in sequence by decreasing or increasing a count value of the counting means when both values are different. Accordingly, in addition to the effect of the second aspect of the invention, since the number of elements to be added can be reduced, the synchronization can be determined with a simple structure.

There is provided a demodulator according to a fifth aspect of the invention which demodulates a multiplex data stream derived by multiplexing a plurality of data streams having the same contents with a time lag provided therebetween, and wherein there is provided a synchronization determining circuit according to the first embodiment including: first separating means for separating the multiplex data stream to output a plurality of data streams based on a determination result outputted from the synchronization determining circuit; first delaying means for delaying at least one of the plurality of data streams outputted from the first separating means by a time corresponding to the time lag; combining means for combining the data stream outputted from the delaying means and a data stream outputted from the first separating means which is not delayed by the first delaying means so as to output a combined signal; and demodulating means for demodulating the combined signal. Accordingly, since synchronization is established to achieve demodulation without using a synchronization word, transmission efficiency is improved. Further, since there is no feedback, no loop delay exists, and an incorrectly decoded sequence is not output for a period of time before synchronization is established. Further, since it is not necessary to provide the maximum pass metric state detecting circuit, circuit scale and consumptive power can be decreased and operating speed can be improved relative to the prior art.

In a demodulator according to a sixth aspect of the invention, the combining means of the fifth aspect of the invention detects absolute values of the inputted data streams and combines the data streams after weighting them based on the detected absolute values. Accordingly, in addition to the effect of the fifth aspect of the invention, a large diversity effect can be achieved as compared with equal gain synthesis.

There is provided a demodulator according to a seventh aspect of the invention, wherein the demodulator of the fifth aspect of the invention is provided with selecting means, instead of the combining means, for detecting a receiving level and selecting, based on the detected receiving level, either one of the data stream outputted from the first delaying means and a data stream outputted from the first separating means which is not delayed by the first delaying means, for outputting to the demodulating means. Accordingly, in addition to the effect of the fifth aspect of the invention, a simple circuit structure can be achieved as compared with equal gain synthesis.

There is provided a demodulator according to an eighth aspect of the invention, wherein the demodulator of the fifth aspect of invention includes determining means for determining the received multiplex data stream and outputting the determined multiplex data stream to the synchronization determining circuit. Accordingly, the determining device in the synchronization determining circuit can be omitted to reduce the number of elements.

There is provided a communication system according to a ninth aspect of invention including a modulating section for modulating an inputted signal to output a modulated signal and a demodulating section for demodulating the modulated signal to output demodulated data. The modulating section includes: convolutional encoding means for convolutionally encoding the inputted signal and outputting at least a first data stream and a second data stream; multiplexing means for multiplexing data strings having the same contents in the first data stream and the second data stream with a time lag provided therebetween and outputting a multiplex data stream; and modulating means for modulating the multiplex data stream and outputting a modulated signal. The demodulating section includes: a the synchronization determining circuit for determining synchronization of the multiplex data stream of the modulated signal and outputting a determination result; second separating means for separating the multiplex data stream based on the determination result outputted from the synchronization determining circuit and outputting a plurality of data streams; second delaying means for delaying at least one of the plurality of data streams outputted from the second separating means by a time corresponding to the time lag; combining means for combining the data stream outputted from the second delaying means and the data stream outputted from the second separating means without being delayed by the second delaying means and outputting a combined signal; and demodulating means for Viterbi-decoding the synthesized signal. Accordingly, since synchronization is established without using a synchronization word, transmission efficiency is improved. Further, since there is no feedback, no loop delay exists in the synchronization determining circuit, and an incorrectly decoded sequence is not output for a period of time before synchronization is established. Further, since it is not necessary to provide the maximum pass metric state detecting circuit, circuit scale and consumptive power can be reduced, and operating speed can be improved relative to the prior art. Further, since the convolutional coding is performed at the transmitting device and the Viterbi decoding is performed at the receiving device, the error rate at the same Eb/No can be lowered.

A communication system according to a tenth aspect of the invention including a modulating section for modulating an inputted signal to output a modulated signal and a demodulating section for demodulating the modulated signal to output demodulated data. The modulating section includes: encoding means for encoding the inputted signal and outputting at least a first data stream and a second data stream; multiplexing means having first branching means for branching the first data stream so as to generate a third data stream and a fourth data stream each having the same contents as the first data stream and second branching means for branching the second data stream so as to generate a fifth data stream and a sixth data stream each having the same contents as the second data stream, the multiplexing means delaying the fourth data stream, the fifth data stream and the sixth data stream relative to the third data stream by fixed times 2T, T and 3T, respectively, and thereafter multiplexing them to output a multiplex data stream; and modulating means for modulating the multiplex data stream and outputting a modulated signal. The demodulating section includes: the synchronization determining circuit according to the first embodiment for determining synchronization of the multiplex data stream of the modulated signal and outputting a determination result; second separating means for separating the multiplex data stream based on the determination result outputted from the synchronization determining circuit and outputting a plurality of data streams; third delaying means for delaying the plurality of data streams outputted from the second separating means by fixed times 2T, T and 3T, respectively, relative to at least one reference data stream being a reference; combining means for combining the reference data stream and the data stream delayed by the fixed time 2T at the third delaying means so as to output as a first combined signal and for combining the data stream delayed by the fixed time T at the third delaying means and the data stream delayed by the fixed time 3T at the third delaying means so as to output as a second combined signal; and demodulating means for decoding the first combined signal and the second combined signal. Accordingly, since synchronization can be established without using a synchronization word, transmission efficiency is improved. Further, since there is no feedback, no loop delay exists in the synchronization determining circuit, and an incorrectly decoded sequence is not output for a period of time before synchronization is established. Further, since it is not necessary to provide the maximum pass metric state detecting circuit, circuit scale and consumptive power can be decreased, and operating speed can be improved relative to the prior art. Further, since the delays between the same data sequences are 2T, respectively, if variation of received signal levels due to fading or the like is gradual, the improvement gained by employing time diversity is large as compared with a system in which the delay is T.

A communication system according to an eleventh aspect of the invention is provided, wherein a demodulating section includes compensating means for compensating for a process delay of the synchronization determining circuit and outputting the multiplex stream after compensation to the second separating means. Accordingly, in addition to the effect of the ninth or tenth aspects of the invention, since the structure is of a feedforward type, demodulation can be performed after synchronization is established so that there is no possibility that an incorrectly decoded sequence will be output.

There is provided a communication system according to a twelfth aspect of the invention, wherein the modulating section in the communication system according to the ninth, tenth or eleventh aspects of the invention, further includes spreading means for performing spectrum spread relative to the multiplex data stream, and the demodulating section further includes spectrum despreading means for performing spectrum despreading relative to the received signal. Accordingly, in addition to the effect of the ninth, tenth or eleventh aspects of the invention, it is possible to provide a communication system which is resilient to interference or disturbance and provides excellent secrecy.

A synchronization determining method according to a thirteenth aspect of the invention determines a synchronization state of a multiplex data stream derived by multiplexing a plurality of data streams having the same contents with a time lag provided therebetween. The method includes: a separating step for separating the inputted multiplex data stream to output a plurality of data streams; a delaying step for delaying at least one of the plurality of data streams outputted at the separating step by a time corresponding to the time lag; a comparing step for comparing the data stream delayed at the delaying step and a data stream outputted at the separating step which is not delayed at the delaying step so as to output comparison data; and a synchronization determining step for determining the synchronization state of the multiplex data stream based on the comparison data. Accordingly, since synchronization is established without using a synchronization word, transmission efficiency is improved. Further, since there is no feedback, no loop delay exists, and an incorrectly decoded sequence is not output for a period of time before synchronization is established. Further, since it is not necessary to provide the maximum pass metric state detecting circuit, circuit scale and consumptive power can be decreased, and operating speed can be improved relative to the prior art.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. A synchronization determining circuit for determining a synchronization state of a multiplexed data stream derived by multiplexing a plurality of data streams having the same contents with a time lag provided therebetween, the synchronization determining circuit comprising:

separating means for separating an inputted multiplexed data stream to output a plurality of data streams;

delaying means for delaying at least one of said plurality of data streams outputted from said separating means by a time corresponding to said time lag;

comparing means for comparing said data stream delayed by said delaying means and at least one other of said plurality of data streams outputted from said separating means which is not delayed by said delaying means so as to output comparison data; and synchronization determining means for determining a synchronization state of said multiplexed data stream based on said comparison data.

2. A synchronization determining circuit as set forth in claim 1 wherein said synchronization determining means includes adding means for adding a given quantity of said comparison data and outputting an adding result and determines a synchronization state of said multiplexed data stream based on said adding result.

3. A synchronization determining circuit as set forth in claim 2 wherein said adding means includes storing means for storing a given quantity of said comparison data and adds in sequence by adding said comparison data newly inputted and subtracting said comparison data newly deleted, relative to an added value of said comparison data stored in said storing means.

4. A synchronization determining circuit as set forth in claim 2 wherein said adding means includes storing means for storing a given quantity of said comparison data and counting means for indicating an added value and compares a value of said comparison data newly inputted to said storing means and a value of said comparison data newly deleted by said storing means so as to add in sequence by decreasing or increasing a count value of said counting means when both values are different.

5. A synchronization determining circuit as set forth in claim 1 wherein said multiplexed data is spectrum spread and said synchronization determining circuit further includes spectrum despreading means for performing inverse spectrum spread relative to said multiplexed data.

6. A demodulator for demodulating a multiplexed data stream derived by multiplexing a plurality of data streams having the same contents with a time lag provided therebetween, the demodulator comprising:

a synchronization determining circuit for determining a synchronization state of said multiplexed data stream;

first separating means for separating said multiplexed data stream to output a plurality of data streams based on a determination result outputted from said synchronization determining circuit;

first delaying means for delaying at least one of said plurality of data streams outputted from said first separating means by a time corresponding to said time lag;

combining means for combining said data stream outputted from said first delaying means and at least one other of said plurality of data streams outputted from said first separating means which is not delayed by said first delaying means so as to output a combined signal; and demodulating means for demodulating said combined signal.

7. A demodulator as set forth in claim 6 wherein said combining means detects absolute values of its inputted data streams and combines its input data streams after weighting them based on detected absolute values for output as said combined signal.

8. A demodulator as set forth in claim 6 further comprising detecting means for detecting said multiplexed data stream and outputting detected multiplexed data stream to said synchronization determining circuit.

9. A demodulator for demodulating a multiplexed data stream derived by multiplexing a plurality of data streams having the same contents with a time lag provided therebetween, the demodulator comprising:

a synchronization determining circuit for determining a synchronization state of said multiplexed data stream;

first separating means for separating said multiplexed data stream to output a plurality of data streams based on a determination result outputted from said synchronization determining circuit;

first delaying means for delaying at least one of said plurality of data streams outputted from said first separating means by a time corresponding to said time lag;

selecting means for detecting a receiving level and selecting, based on detected receiving level, either one of the data stream outputted from said first delaying means and one other data stream of said plurality of data streams outputted from said first separating means without being delayed by said first delaying means; and demodulating means for demodulating said selected signal.

10. A demodulator as set forth in claim 9 further comprising detecting means for detecting said multiplexed data stream and outputting detected multiplexed data stream to said synchronization determining circuit.

11. A communication system comprising:

a modulating section for modulating an inputted signal to output a modulated signal, said modulating section includes convolutional encoding means for convolutionally encoding said inputted signal and outputting at least a first data stream and a second data stream, multiplexing means for multiplexing data strings having the same contents in said first data stream and said second data stream with a time lag provided therebetween and outputting a multiplexed data stream, and modulating means for modulating said multiplexed data stream and outputting a modulated signal; and a demodulating section for demodulating said modulated signal to output demodulated data, said demodulating section includes a synchronization determining circuit for determining synchronization of said multiplexed data stream of said modulated signal and outputting a determination result, separating means for separating said multiplexed data stream based on the determination result outputted from said synchronization determining circuit and outputting a plurality of data streams, delaying means for delaying at least one of said plurality of data streams outputted from said separating means by a time corresponding to said time lag, combining means for combining the data stream outputted from said delaying means and another of said plurality of data streams outputted from said separating means which is not delayed by said delaying means and outputting a combined signal, and demodulating means for Viterbi-decoding said combined signal.

12. A communication system as set forth in claim 11 wherein said demodulating section is provided with compensating means for compensating for process delays of said synchronization determining circuit and outputting said multiplexed stream after compensation to said separating means.

13. A communication system as set forth in claim 11 wherein said modulating section further includes spreading means for performing spectrum spread relative to said multiplexed data stream and said demodulating section further includes spectrum despreading means for performing inverse spread relative to the modulated signal.

14. A communication system comprising:

a modulating section for modulating an inputted signal to output a modulated signal, said modulating section includes encoding means for encoding the inputted signal and outputting at least a first data stream and a second data stream, multiplexing means having first branching means for branching said first data stream so as to generate a third data stream and a fourth data stream each having the same contents as said first data stream and second branching means for branching said second data stream so as to generate a fifth data stream and a sixth data stream each having the same contents as said second data stream, said multiplexing means delaying the fourth data stream, the fifth data stream and the sixth data stream relative to said third data stream by fixed times 2T, T and 3T, respectively, and thereafter multiplexing them to output a multiplexed data stream, and modulating means for modulating said multiplexed data stream and outputting a modulated signal; and a demodulating section for demodulating said modulated signal to output demodulated data, said demodulating section includes a synchronization determining circuit for determining synchronization of said multiplexed data stream of said modulated signal and outputting a determination result, separating means for separating said multiplexed data stream based on the determination result outputted from said synchronization determining circuit and outputting a plurality of data streams, delaying means for delaying said plurality of data streams outputted from said second separating means by fixed times 2T, T and 3T, respectively, relative to at least one reference data stream, combining means for combining said reference data stream and the data stream delayed by the fixed time 2T at said delaying means so as to output as a first combined signal and for combining the data stream delayed by the fixed time T at said third delaying means and the data stream delayed by the fixed time 3T at said third delaying means so as to output as a second combined signal, and demodulating means for decoding said first combined signal and said second combined signal.

15. A communication system as set forth in claim 14 wherein said modulating section further includes spreading means for performing spectrum spread relative to said multiplexed data stream and said demodulating section further includes spectrum despreading means for performing inverse spread relative to the received signal.

16. A synchronization determining method for determining a synchronization state of a multiplexed data stream derived by multiplexing a plurality of data streams having the same contents with a time lag provided therebetween, the synchronization determining method comprising the steps of:

separating said inputted multiplexed data stream into a plurality of data streams;

delaying at least one of said plurality of data streams by a time corresponding to said time lag;

comparing said delayed data stream and another one of said plurality of data streams which is not delayed so as to generate comparison data; and determining the synchronization state of said multiplexed data stream based on said comparison data.

* * * * *

UNITED STATES PATENT AND TRADEMARK OFFICE
CERTIFICATE OF CORRECTION

PATENT NO. : 5,844,907
DATED : December 1, 1998
INVENTOR(S) : Tatsuya Uchiki et al.

It is certified that error appears in the above-indentified patent and that said Letters Patent is hereby corrected as shown below:

Col. 11, line 11, insert -- (wherein, ⊕ represents the EXOR operation) --.

Signed and Sealed this

Fourteenth Day of March, 2000

Attest:

Q. TODD DICKINSON

Attesting Officer

Commissioner of Patents and Trademarks